United States Patent [19]

Gayraud et al.

[11] Patent Number: 5,436,637
[45] Date of Patent: Jul. 25, 1995

[54] GRAPHICAL USER INTERFACE SYSTEM AND METHODS FOR IMPROVED USER FEEDBACK

[75] Inventors: Charles E. Gayraud; Perry A. Gee, both of Santa Cruz, Calif.

[73] Assignee: Borland International, Inc., Scotts Valley, Calif.

[21] Appl. No.: 26,720

[22] Filed: Mar. 5, 1993

[51] Int. Cl.$^6$ .................. G09G 5/14; G09G 5/40
[52] U.S. Cl. ................... 345/116; 345/146; 395/155; 395/159
[58] Field of Search ............ 345/116, 145, 146; 395/155, 156, 159

[56] References Cited

U.S. PATENT DOCUMENTS

| | | | |
|---|---|---|---|
| 4,310,839 | 1/1982 | Schwerdt | 345/146 |
| 4,622,013 | 11/1986 | Cerchio | 434/118 |
| 4,656,603 | 4/1987 | Dunn | 345/146 |
| 4,742,473 | 5/1988 | Shugar et al. | 395/156 |
| 4,789,962 | 12/1988 | Berry | 395/156 |
| 4,964,077 | 10/1990 | Eisen | 395/275 |
| 5,123,087 | 6/1992 | Newell | 395/155 |
| 5,235,679 | 8/1993 | Yoshizawa et al. | 395/156 |

OTHER PUBLICATIONS

Simpson, Alan, *Mastering WordPerfect 5.1 & 5.2 for Windows*, Sybex Publication, 1993, pp. 6-8, 69-70, 646-649, 659, 665-666.
Webster, Tony & Associates, *WordPerfect 5.1 for Windows by Example*, Webster & Associates Publication, 1992, pp. 1, 3, 9, 381, 385, 551-554.
Matthies, Kurt W. G., *Balloon Help Takes Off*, MacUser, Dec. 1991, pp. 241-248.

*Primary Examiner*—Jeffery Brier
*Attorney, Agent, or Firm*—John A. Smart; Vernon A. Norviel; Michael J. Ritter

[57] ABSTRACT

Graphical user interface system and methods for providing "hints" for screen objects of interest, particularly user interface elements which rely upon multitudes of iconic (bitmap image) indicia. The interface includes a static (status) frame or window positioned in a nonintrusive fashion below or to one side of a client area (active portion) of a user interface. The frame is continually updated with appropriate descriptors or "hints" (e.g., text and/or graphics) as a screen cursor moves from one screen object to another.

40 Claims, 19 Drawing Sheets

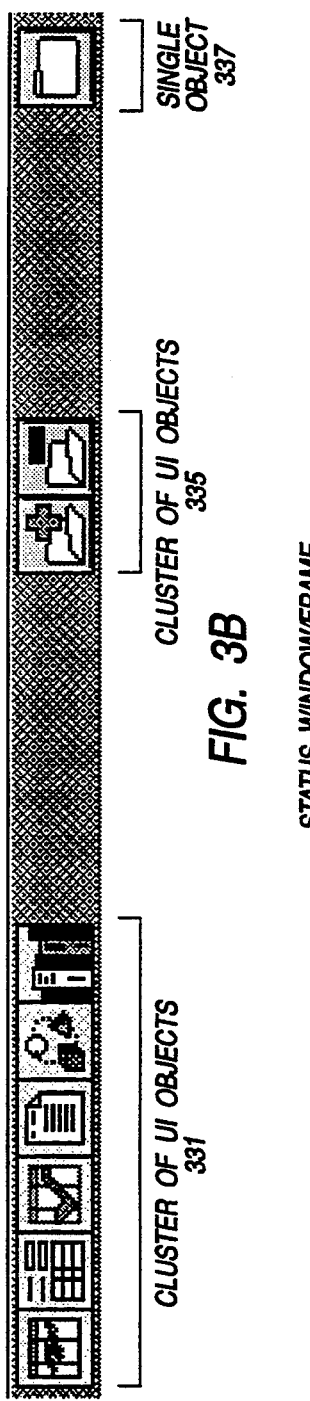
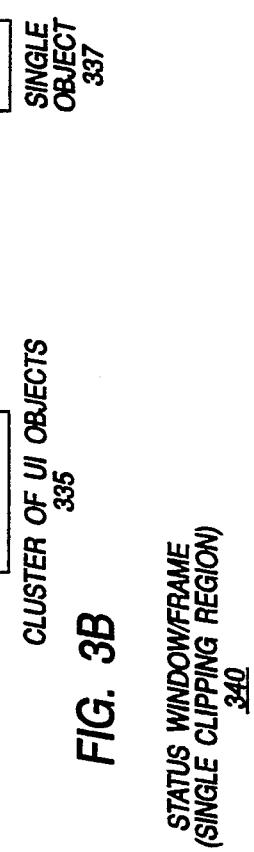
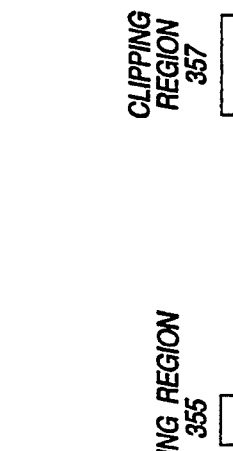
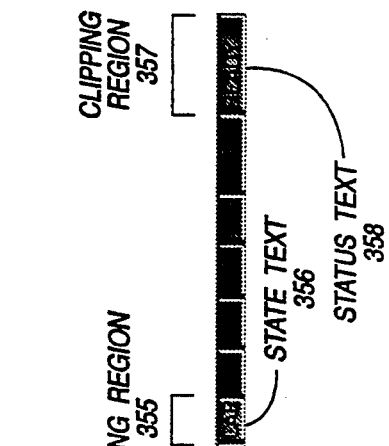
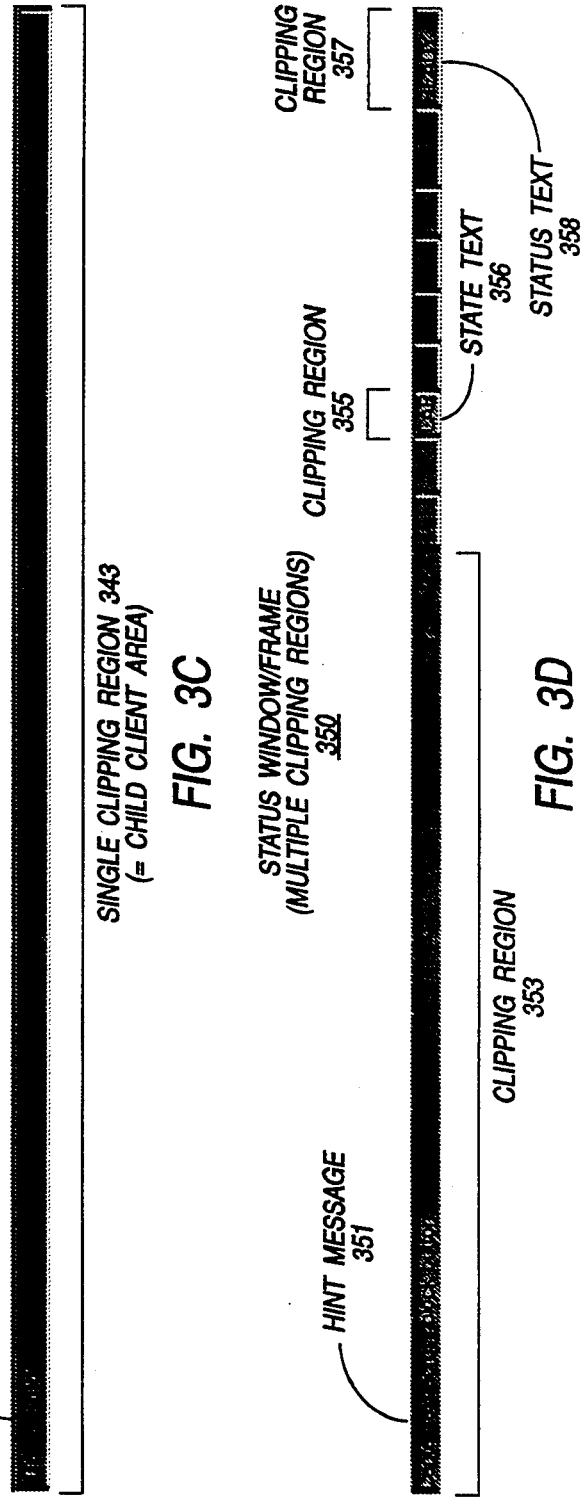
FIG. 3B
FIG. 3C
FIG. 3D (a)

(b)

(c)

(d)

(e)

(f)

(g)

(h)

(i)

(j)

(k)

(l)

(m)

(n)

(o)

(p)

FORM DESIGN TOOLBAR
WITH HINTS

REPORT DESIGN TOOLBAR WITH HINTS

QUERY WINDOW TOOLBAR WITH HINTS

PROGRAMMING EDITOR TOOLBAR
WITH HINTS

DEBUGGER TOOLBAR
WITH HINTS

GRAPHICAL USER INTERFACE SYSTEM AND METHODS FOR IMPROVED USER FEEDBACK

COPYRIGHT NOTICE

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

The present invention relates generally to computer systems and, more particularly, to systems and techniques for assisting a user of a computer system.

With the advent of the personal computer, the use of computer systems is becoming increasingly prevalent in everyday life. In the past, computers were often housed in highly restricted areas, with access limited to a few computer scientists and programmers. Today, however, computers can be seen on the desktops of most business professionals. Running software applications such as word processors and spreadsheets, for example, even the average business professional can realize substantial productivity gains. Besides the business environment, computers can also be found in wide use both at home and at school.

The typical user of a computer today has little or no training in the computer sciences or even in the basic use of a personal computer. In order to operate a computer effectively, however, he or she must overcome a steep learning curve, one requiring mastery of a number of commands and data formats. One approach to this problem is to spend hours laboring over often-cryptic user manuals—an unattractive option at best. Instead, most users usually abandon printed manuals in favor of trial-and-error learning.

To increase ease of use, designers of computer systems have labored for decades to create architectures which are intuitive. Most of this effort has been centered around the user interface or UI—the means by which a user communicates (i.e., supplies input and receives output) with a computer. With increasingly widespread availability of powerful microprocessors, graphical user interfaces (GUIs, pronounced "gooeys") have become feasible.

A GUI is a type of display format that enables a user to operate a computer by pointing to pictorial representations, such as "windows" and "icons" (bitmaps), displayed on a screen device. A window is a rectangle displayed on the screen that affords a user workspace within a program. In typical operation, the user may move the window about on the screen, change its size or shape, enlarge it to fill the screen, close it entirely, or change how much of its contents are displayed. To aid the user in the manipulation of its contents, a window will typically include a number of user interface components, such as buttons, menus, sliders, and the like. Outside the window, the screen can display other screen objects, such as other windows, disk drive icons, or even a trash can icon.

To navigate within a GUI, most systems employ a screen cursor or pointer, typically displayed as a small arrow icon (bitmap) which allows the user to select individual points on the screen. In operation, the screen cursor is moved to a desired screen location in response to movements of a pointing device (e.g., mouse) by the user. Besides effecting cursor movement, most pointing devices include one or more switches or "mouse buttons" for specifying additional user input or "user events." Since many user choices may be entered through use of a pointing device (e.g., for selecting screen objects), instead of input with a keyboard, the need for the user to memorize special commands has been lessened.

Most GUIs feature a menu bar, for instance, running across the top of the screen which serves to group or categorize commands available to the user. Clicking on an item on the menu bar typically causes a "pull-down" menu to appear. This second or "submenu" also includes a number of items, each of which is associated with a desired action, including the display of even more menus. To select a desired action, the user usually clicks the corresponding menu item with the screen or mouse pointer. For some menu items, particularly those which may be nested in several layers deep, a keyboard equivalent or "hot key" may be available but, unfortunately, these must also be memorized by the user.

With well-known examples including Apple's Macintosh (Mac) interface, Microsoft's Windows, and IBM's OS/2 Presentation Manager, these interfaces simplify computer operation by providing users with a more-or-less consistent interface across applications. Nevertheless, most application software still requires complex user actions, such as "double-clicking" or "dragging" a mouse device while a key is held down. Thus, there typically exists a plethora of ways to do almost anything in a graphical interface, such as the Mac. While this increases the flexibility of a system, it also adds to the complexity of the interface that the user must master. And this problem is by no means limited just to novice users. Experienced computer users are reluctant to read user manuals and, hence, often fair no better than novice users. All told, the user is still required to memorize special commands.

Standard windowing interfaces depend heavily on a clunky system of pull-down menus. While pull-down menus are an improvement over command-line (e.g., MS-DOS) interfaces, they are non-metaphoric or non-analogous to ordinary objects, i.e., ones familiar to the user. Perhaps the biggest weakness of pull-down menus is the requirement that the user must know beforehand which menu contains the item or function of interest. If the user does not know which pull-down menu, submenu, or dialog box contains the item he or she is seeking, the user will spend an inordinate amount of time checking the contents of each in an effort to hunt down the needed item. And often the search is in vain. Moreover, since functions for a given object (e.g., text object) are often scattered over several disparate menus, the user is discouraged from interacting and experimenting with the object. Thus, many prior art windowing GUIs are no more intuitive or useful to the user than other menuing systems.

One approach to overcoming this problem has been the implementation of "smart icons." This interface technique employs screen buttons painted with icons which are supposed to tell the user what the buttons do. This approach, however, makes the interface problem even worse because the meaning of the individual buttons is often not easily grasped. For instance, some button images are so small or so numerous that it is hard to see the icons well enough to discern what they mean.

Thus, the approach is frequently no more helpful than hiding the desired function deep inside a menuing system. Thus, with advances in computer and software technology, application software has not necessarily become easier to use. Instead, technological advances have been largely employed to build more complex functions into existing applications, often resulting in a complicated user interface, such as a staggering array of icons, which leave the user even more bewildered.

The present invention recognizes that it is highly desirable to provide computers with system and application software which is highly intuitive to users, including those who are untrained in the use of the software. What is needed is a system and interface methods which require little or no knowledge of specific commands by the user. Moreover, such methods should not "invade" the user screen workspace (client area), that is, they should operate in a non-intrusive fashion. The present invention fulfills this and other needs.

SUMMARY OF THE INVENTION

The present invention recognizes that present-day implementations of graphical user interfaces often serve to further confuse a user of a computer system. Examples include toolbars or "smart" icons, which, owing to the vast number of bitmap images typically employed, force the user to memorize a multitude of (often arbitrary) images.

The present invention further recognizes that conventional techniques for providing screen feedback, such as "balloon help" and "intelligent cursors," operate in a fashion which is not only intrusive to the active workspace (client area), but is also computationally very inefficient. Balloon help, for instance, by "popping up" at a screen location proximate the cursor location, typically obscures the work product of interest. Moreover, the task of continually creating and destroying user interface windows (the "balloons"), being resource intensive, substantially degrades the performance of such systems. By overwriting the client area (i.e., active screen portion where the user's data is represented) and thereby destroying the screen image of the underlying work product, such systems must undertake the computationally expensive operation of "repainting" the user image.

According to the present invention, a graphical user interface includes improved interface components and methods for supplying the user with "hints" which enable users to completely discern the functionality of smart icons, interface objects, or other screen components of interest The "hints", which may be in the form of textual (or graphic) messages, are restricted to a non-intrusive location of the screen, typically located along one side (e.g., bottom or inferior portion) of a program's client area. When the screen cursor touches an object (e.g., enters a button) of interest, the system identifies the object with an appropriate descriptor hint displayed in the non-intrusive region.

In an exemplary method of the present invention, the entrance of the cursor into and departure from screen objects is continually monitored as follows. Upon entrance of the cursor into the domain of an object (e.g., boundary of a known screen region), the object is identified (e.g., from hit-testing, its window handle, or the like). Upon identification, a corresponding descriptor or "hint" may be determined. This hint is displayed in a status frame or window—a static frame (i.e., it is continually displayed) along a single portion (e.g., the bottom) of the client area. Upon departure of the cursor from the object, the descriptor is cleared or erased from the status window. In this manner, the system may continually monitor and describe system objects of interest in a non-intrusive and computationally frugal fashion.

BRIEF DESCRIPTION OF THE DRAWINGS

FIGS. 3B-D are bitmap illustrations further describing interface components from the graphical user interface of FIG. 3A.

DETAILED DESCRIPTION OF A PREFERRED EMBODIMENT

The following description will focus on the presently preferred embodiment of the present invention, which is operative in the Microsoft ® Windows environment. The present invention, however, is not limited to any particular one application or any particular windows environment. Instead, those skilled in the art will find that the system and methods of the present invention may be advantageously applied to a variety of system and application software, including database management systems, wordprocessors, spreadsheets, and the like. Moreover, the present invention may be embodied on a variety of different platforms, including Macintosh, UNIX, NextStep, and the like. Therefore, the description of the exemplary embodiments which follows is for purposes of illustration and not limitation.

System Hardware

Figure 1A:
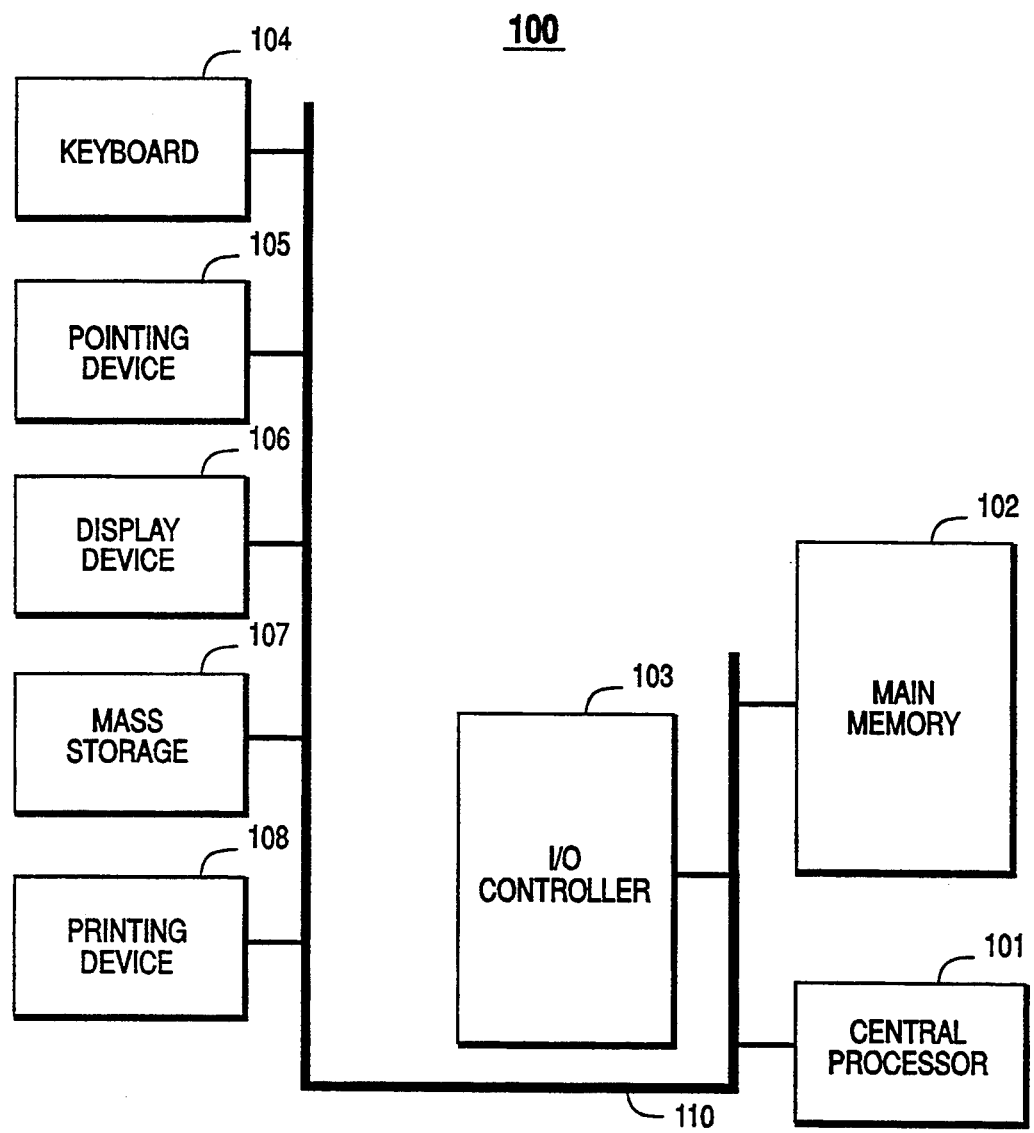
FIG. 1A is a block diagram of a computer system in which the present invention may be embodied.

As shown in FIG. 1A, the present invention may be embodied in a computer system such as the system 100, which comprises a central processor 101, a main memory 102, an input/output controller 103, a keyboard 104, a pointing device 105 (e.g., mouse, track ball, pen device, or the like), a display device 106, and a mass storage 107 (e.g., hard disk). Additional input/output devices, such as a printing device 108, may be included in the system 100 as desired. As illustrated, the various components of the system 100 communicate through a system bus 110 or similar architecture. In a preferred embodiment, the computer system 100 includes an IBM-compatible personal computer, which is available from several vendors (including IBM of Armonk, N.Y.).

System Software

A. Overview

Figure 1B:
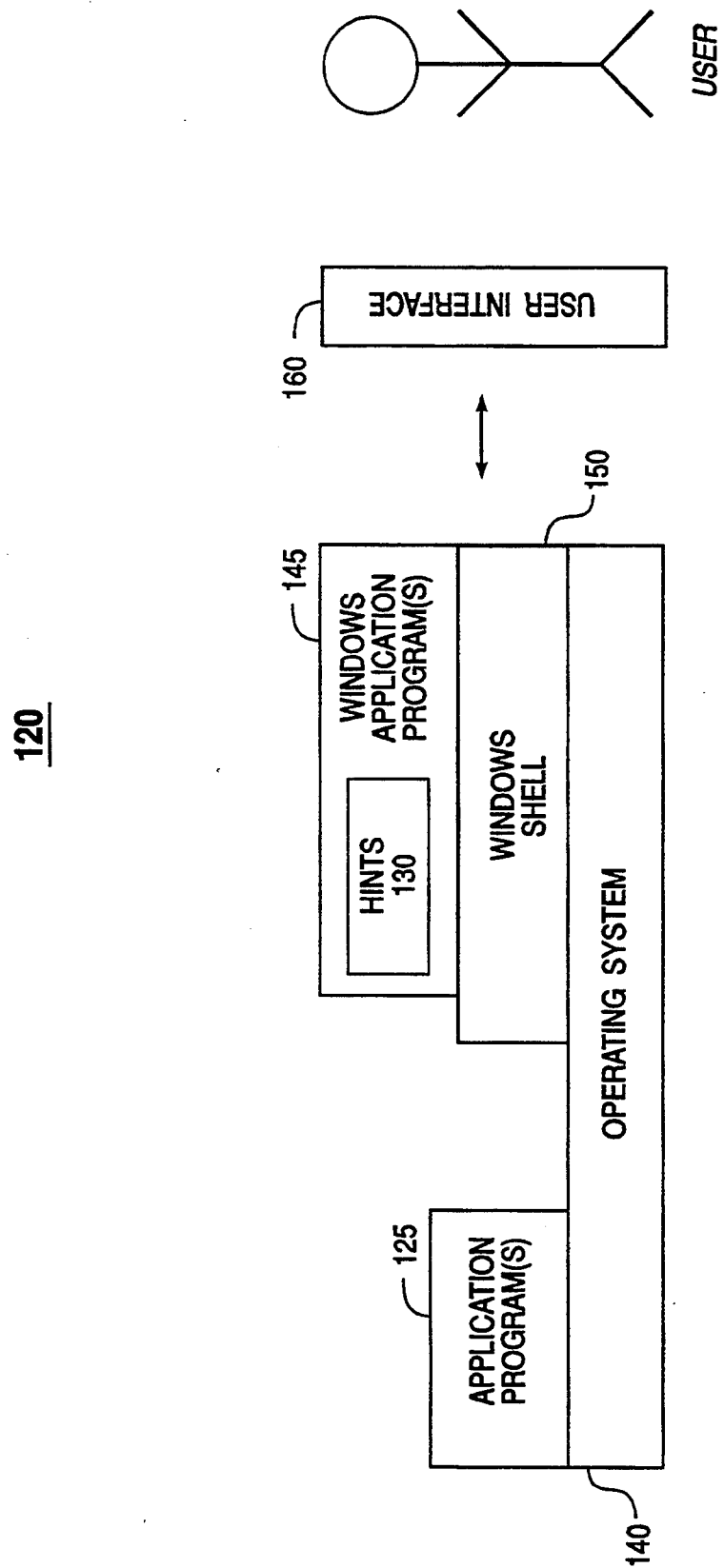
FIG. 1B is a block diagram of a software system of the present invention, which includes operating system, application software, and user interface components.

Illustrated in FIG. 1B, a computer software system 120 is provided for directing the operation of the computer system 100. Software system 120, which is stored in system memory 102 and on disk memory 107, includes a kernel or operating system (OS) 140 and a windows shell 150. One or more application programs, such as application software 125 or windows application software 145, may be "loaded" (i.e., transferred from storage 107 into memory 102) for execution by the system 100.

System 120 includes a user interface (UI) 160, preferably a graphical user interface (GUI), for receiving user commands and data. These inputs, in turn, may be acted upon by the system 100 in accordance with instructions from operating module 140, windows 150, and/or application modules 125, 145. The UI 160 also serves to display the results of operation, whereupon the user may supply additional inputs or terminate the session. Although shown conceptually as a separate module, the UI is typically provided by windows shell 150, operating under OS 140. In a preferred embodiment, OS 140 is MS-DOS and windows 150 is Microsoft® Windows; both are available from Microsoft Corporation of Redmond, Wash.

System 120 also includes a hints module 130 of the present invention for aiding users of the computer 100. As shown, the module 130 is typically constructed within applications 145. Before undertaking a detailed description of the construction and operation of the hints module 130 itself, however, it is helpful to first examine the general methodology of UI 160 and the event-driven architecture driving its operation.

B. Graphical User (Windowing) Interface

Figure 1C:
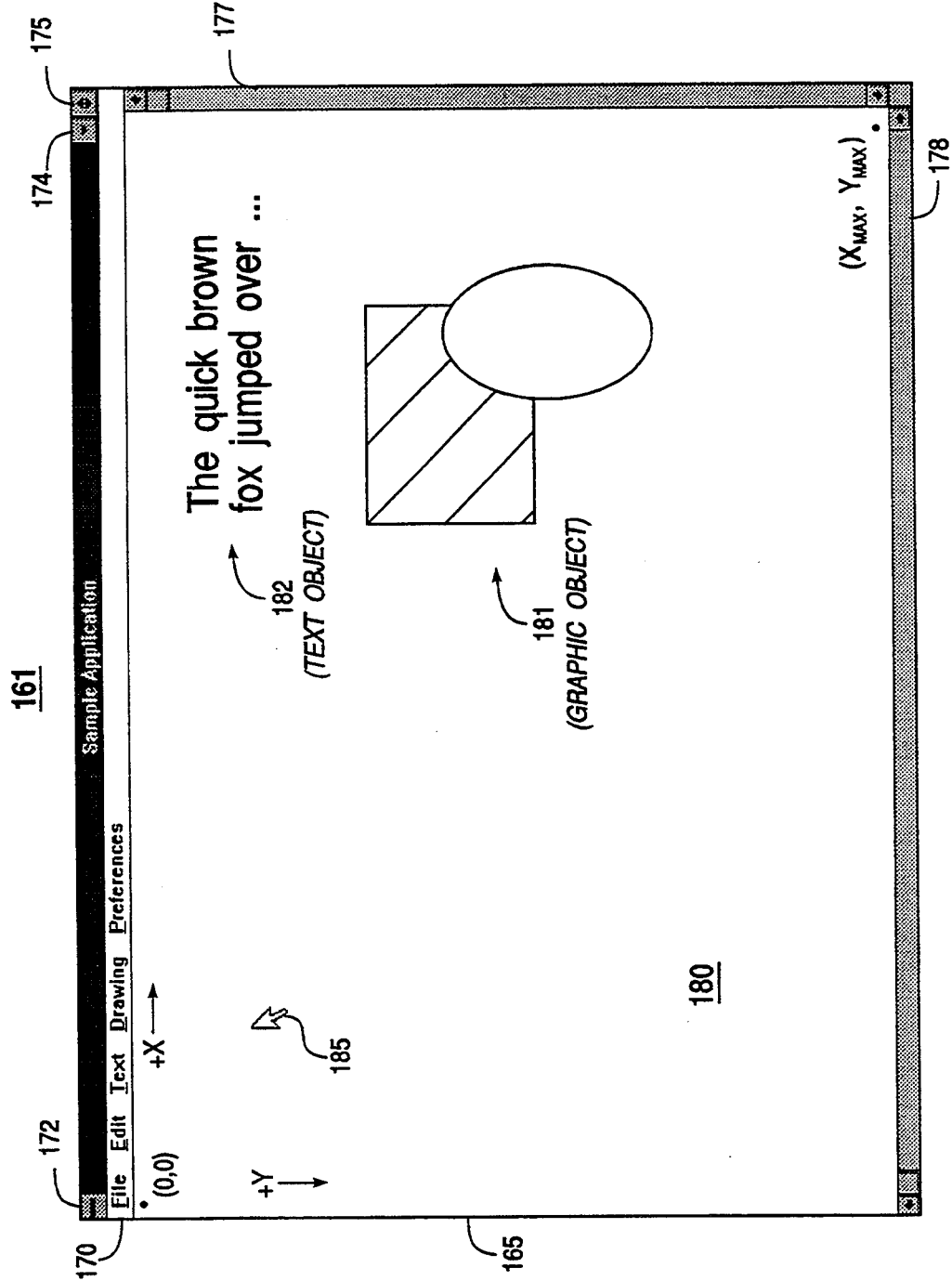
FIG. 1C is a bitmap screenshot illustrating the basic architecture and functionality of a graphical user interface in which the present invention may be embodied.

As shown in FIG. 1C, the system 100 typically presents UI 160 as a windowing interface or workspace 161. Window 161 is a rectangular, graphical user interface (GUI) for display on screen 106; additional windowing elements may be displayed in various sizes and formats (e.g., tiled or cascaded), as desired. At the top of window 161 is a menu bar 170 with a plurality of user-command choices, each of which may invoke additional submenus and software tools for use with application objects. Window 161 includes a client area 180 for displaying and manipulating screen objects, such as graphic object 181 and text object 182. In essence, the client area is a workspace or viewport for the user to interact with data objects which reside within the computer system 100.

Windowing interface 161 includes a screen cursor or pointer 185 for selecting and otherwise invoking screen objects of interest. In response to user movement signals from the pointing device 105, the cursor 185 floats (i.e., freely moves) across the screen 106 to a desired screen location. During or after cursor movement, the user may generate user-event signals (e.g., mouse button "clicks" and "drags") for selecting and manipulating objects, as is known in the art. For example, Window 161 may be closed, resized, or scrolled by "clicking on" (selecting) screen components 172, 174/5, and 177/8, respectively. Keystroke equivalents, including keyboard accelerators or "hot keys", are provided for performing these and other user operations through keyboard 104.

C. Event-driven Architecture

Underlying the windowing interface is a message or event-driven architecture. This model is perhaps best described by contrasting its operation with that of a modal or sequential architecture which has been traditionally employed. In this manner, the reader may appreciate the added flexibility of a message-driven system—flexibility which is employed by the system of the present invention for providing object-specific hints for objects which the screen cursor touches.

Figure 2:
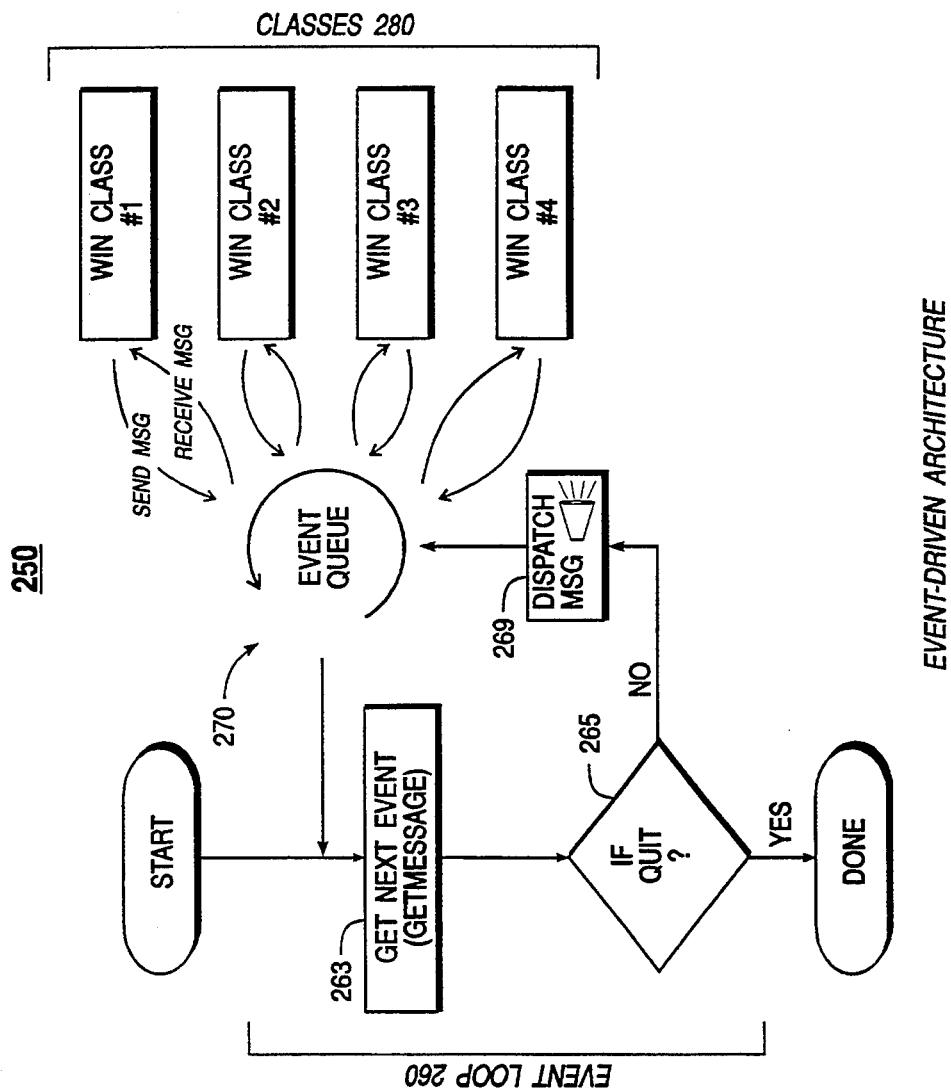
FIG. 2 is a pair of flowcharts contrasting the operation of conventional modal architecture with that of event-driven architecture.
Figure 2:
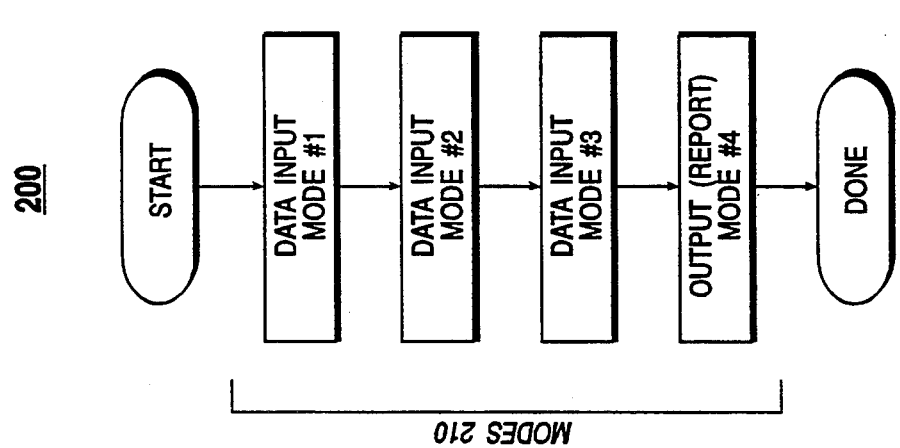

As shown in FIG. 2, a modal program 200 comprises a series of discrete operating blocks or modes 210, with a well-defined beginning, middle and end. In actual operation, such a program typically displays a series of input screens for receiving user information, for example, to create a written report. For instance, the first entry screen may require a customer name, the second a customer address, the third a part number, and so on. The program typically terminates in an output mode, for reporting results determined from the various inputs. Thus, the program 200 follows a fairly rigid sequence of operation, with each input or entry mode demanding successful completion before the program proceeds to the next step.

While a modal program is relatively easy to design and implement, it is not so easy to use. The design certainly ensures that all required information is entered, but only at the expense of forcing users to operation in a manner dictated by the program. Specifically, since the program is built around a pre-arranged set of modes, a user cannot get from one mode to another without first completing a previously-required mode. In the present example, for instance, a user must needlessly complete a customer name entry screen (and any other intervening input screens) just to access part number information. Any deviation from this sequence by the user is simply not permitted. Lacking flexibility, modal programs make a poor choice for handling real-world tasks.

As shown in the second half of FIG. 2, an event-driven architecture 250 eschews a pre-selected sequence, opting instead for an "event loop." The event loop 260 is a centralized mechanism for processing messages about user and system events. It includes an event queue 270 and mechanisms for retrieving 263 and dispatching 269 messages to various window classes 280. Before each of these components is described in detail, it is helpful to have a firm understanding of "messages."

In a typical modal environment, especially those typified by a character-based UI, a program reads from the keyboard by making an explicit call to a function, such as the C function getchar(). The function typically waits until the user presses a key before returning the character code to the program; all system activity ceases until completion of this one step. In a Windows environment, in contrast, the operating system uses messages to manage and synchronize multiple applications and hardware events, such as clicks of a mouse or presses of a keyboard, which are converted to messages by Windows event handlers.

From a programming perspective, a message is simply a data structure containing information about a particular event. In Microsoft Windows, a message is a 16-bit unsigned integer which serves as a symbolic constant for a particular event; packaged within this integer is a message identifier and message parameters, which vary with each event type represented. For example, messages from a window object might include information about creating (WM_CREATE), closing (WM_CLOSE), moving (WM_MOVE), and re-sizing (WM_SIZE) the window. The input messages are collected in a system-wide queue and then directed to the proper window. These messages, along with timer and screen paint messages, must be passed to the target application(s) of interest.

A mechanism is provided for retrieving messages from the system queue and dispatching them to the appropriate application which, in turn, may proceed to process any message that arrives. Each window belongs to a certain window type or "class" which defines certain characteristics common to all windows of that type. Associated with each type is a Windows function which processes all messages sent to windows of its type. An application queue is provided where Windows may place messages that belong to a specific application. When the application is ready to receive input, it simply reads the awaiting messages. If none are found or if there exists a message for other applications with higher priority, Windows passes control to the other applications.

The message or event loop 260 shown in FIG. 2, for example, may be simply coded as:

```
while (GetMessage (&msg, NULL, 0, 0))
{
    TranslateMessage (&msg) ;
    DispatchMessage (&msg) ;
}
return msg.wParam ;
}
``` where a message (&msg) is retrieved by a call to GetMessage (step 263); if needed, the retrieved message may be translated by a call to TranslateMessage() and then dispatched by a call to DispatchMessage (step 269). This "while" loop continues until the GetMessage function returns a value of zero—indicating that the loop has read a WM_QUIT message from the queue, telling the application to end (yes at step 265).

In addition to the messages generated by Windows, applications can create their own messages and place them in the application queues of other applications. The SendMessage and PostMessage functions let applications pass messages to their windows or to the windows of other applications. The PostMessage function directs Windows to post the message by placing it in the application queue. Control returns immediately to the calling application, and any action to be carried out as a result of the message does not occur until the message is read from the queue.

The SendMessage function, on the other hand, directs Windows to send a message directly to the given Windows function, thereby bypassing the application queue. Windows does not return control to the calling application until the Windows function that receives the message has processed it. Such an unqueued message, however, is generally a message that affects the window only.

The general mechanism for retrieving and dispatching messages in an event-based system, such as Microsoft Windows, is known in the art; see, e.g., Petzold, C., *Programming Windows*, Second Edition, Microsoft Press, 1990. Additional information can be found in Microsoft's Window Software Development Kit, including: 1) *Guide to Programming*, 2) *Reference*, Vols. 1 and 2, and 3) *Tools*, all available from Microsoft Corp. of Redmond, Wash. The disclosures of each of the foregoing are hereby incorporated by reference.

Preferred Graphical User Interface

Figure 3A:
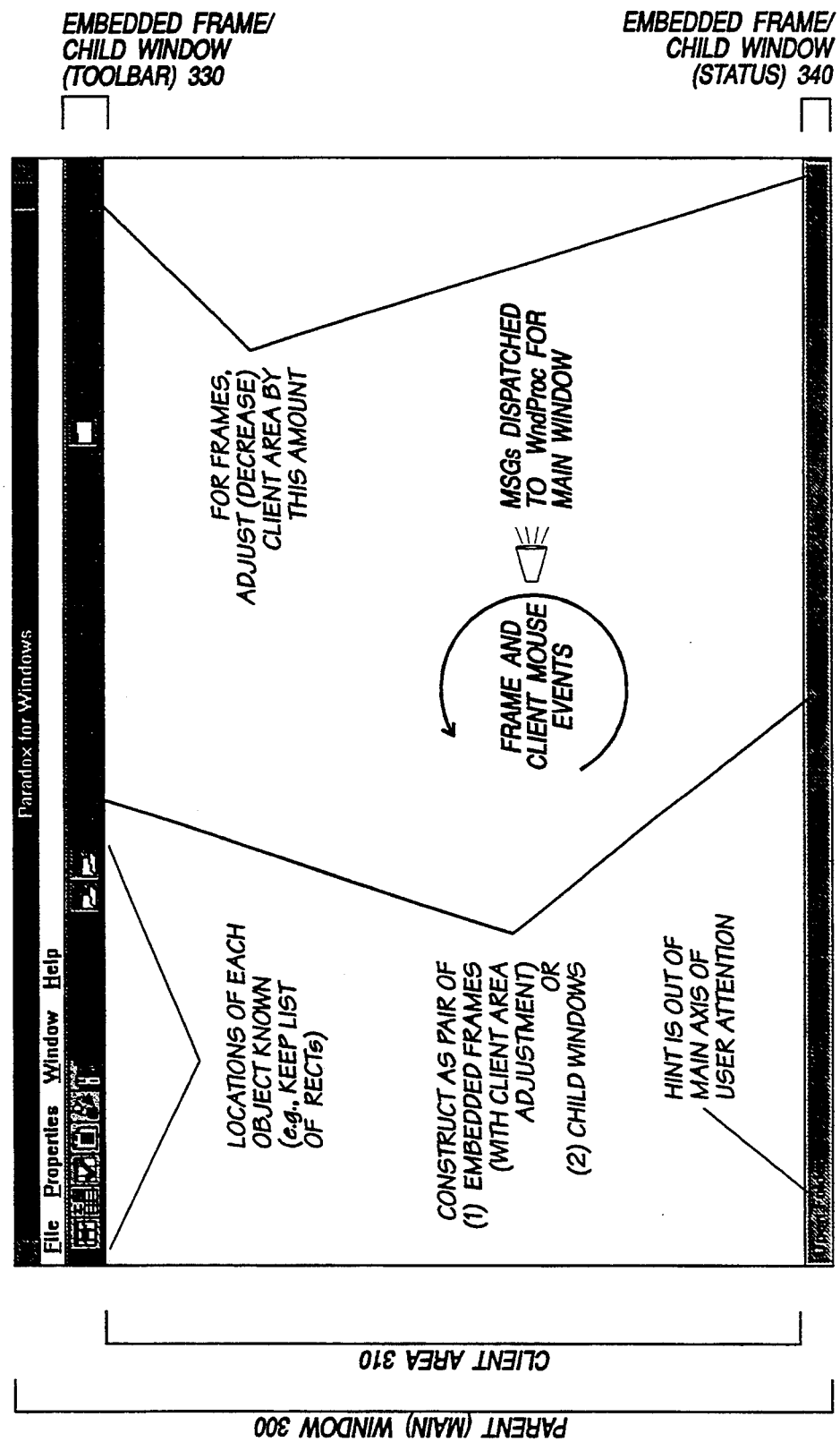
FIG. 3A is a bitmap screenshot illustrating an improved graphical user interface of the present invention.

Referring now to FIG. 3A, a preferred graphical user interface of the present invention will be described. As shown, the interface includes a parent or main window 300 having a client area 310, in a fashion similar to that for the above-described Windows interface 161 (in FIG. 1C). In addition, however, the main window 300 includes a plurality of child windows or "toolbar" 330 and a "status" child window 340. Each will be examined in turn.

With specific reference to FIG. 3B, the toolbar 330 comprises a plurality of "custom control" buttons, typically positioned just below the main menu. Providing quick access to the equivalents of menu commands (i.e., word on a menu one chooses to perform an action), the toolbar greatly speeds up a given task, such as navigating through one's data. As shown, selected ones of the buttons may be clustered together (e.g., cluster 331 and cluster 335) according to (similar) functionality. Alternatively, buttons may be separated (e.g., control or button 337). Thus, a toolbar typically appears as set of bitmaps or icons below the menu line in an application's main window. It may contain buttons, edit fields, combo boxes, and the like. In a well-designed program, controls are grouped by related functionality.

The client area may be divided into several smaller logical areas. By using "hit-testing"—determining where on the screen the user is pointing at with the cursor—a program may determine the current location of the cursor. In general, hit-testing involves calculations using the X- and Y- coordinates passed to a Windows window procedure (in the lParam parameter of the mouse message). Hit-testing is simplified through the use of "child windows." The child windows divide the entire client area into several smaller rectangular regions. Each child window has its own window handle, window procedure, and client area. Each window procedure receives mouse messages that apply only to its child window.

A particular application of child windows is for creating "child window controls." From a programmer's viewpoint, toolbars are child windows located at the top of a main window's client area. They extend across the width of the client area and are automatically resized whenever the main window changes shape. The program's other windows inhabit the remaining client area of the main window, typically below the toolbar. A wordprocessing application, for instance, will have one or more document windows open in the client area. These additional windows are typically displayed in the portion of the client area which is not occupied by the toolbar.

In the Windows programming environment, therefore, the most basic building block of the user interface construction is the "control." In Windows, a control is a standard child window that has been registered to participate as a component of the graphical user interface. Controls may receive input, display output, or perform both input and output. Windows provides built-in support for six common control classes: button, edit, list box, combo box, scroll bar, and static. Controls are characterized by their high degree of specialization and focus. The button control class, for instance, simply presents a clickable box for yes or no and multiple-choice input. To this, one can add his or her own "custom controls" to augment these common classes.

Toolbars are typically constructed from "owner-drawn" buttons. These differ from standard buttons only in that the application (not the operating system) assumes full responsibility for the button, including painting it, setting input focus, selecting it, and enabling or disabling it. Thus, a custom control, such as a toolbar button, is a specialized type of child window that responds to dialog messages and participates with event processing with other similar (button) windows.

Each child may talk to its parent. For instance, when one clicks a button with the mouse, a child window control sends a WM_COMMAND message to its parent window. The values of wParam and lParam are as follows:

| wParam | Child window ID |
|---|---|
| LOWORD (lparam) | Child window handle |
| HIWORD (lparam) | Notification code |

The child window ID is the value passed to Windows CreateWindow when the child window is created; the child window handle is the value that windows returns from the CreateWindow call which created the child. The notification code is a submessage code which the child window uses to tell the parent window in more detail what the command message means. By tracking movement of the screen cursor (e.g., by processing Windows "mouse messages"), one may determine if the cursor has traversed an object boundary (i.e., entered a new window).

Referring now to FIG. 3C, the status window of the present invention will be described. Status window 340 comprises a single child window positioned substantially along one edge of the client area, preferably positioned along the inferior or bottom portion of the client area. It includes a single clipping region 343 equal to the client area of the child window. The status window 340 serves to display hint message 341, which is described in further detail below.

As shown in FIG. 3D, a status window may include multiple clipping regions for the display of different messages. Status window 350, for instance, includes a clipping region 353 for the display of hint text 351. In addition, it includes a clipping region 355 for the display of state text 356, and a clipping region 357 for the display of status text 358. State text 356 indicates a state of a key of interest (e.g., caps lock key); status text 358, on the other hand, indicates the status of the program (e.g., "READY" for a spreadsheet application).

The construction and operation of child windows in a windowing environment such as Microsoft Windows is known in the art. From Petzold's *Programming Windows*, for instance, a detailed description may be found in chapter 6 (Child Window Controls). For a discussion specific to toolbars, see Ladd, S., *Creating Control Bars in Windows*, PC Techniques, October/November 1992, pages 32–36. The disclosures of each of the foregoing are hereby incorporated by reference.

In an alternate, more preferred method of the present invention, the toolbar and status window are created as embedded frames of the main window. In particular, the client area 310 of the window 300 is decreased in size by an amount equal to the area of the toolbar and the status window or frame. This technique has the advantage that events within either frame are processed by the windows procedure for the main window, thus simplifying design.

In a preferred embodiment, a buttons of a frame-based toolbar may be constructed and maintained from the following data structure (BUTTONDATA record):

```
// Internal representation of a button
typedef struct
{
    BUTTONINFO   info;    // Contain state and other
                          info about button
    HBITMAP      hBmp;    // Bitmap use to draw the button
    RECT         rc;      // Coordinate relative to
                          the desktop window.
} BUTTONDATA;
```

An array of BUTTONDATA records may be referenced through a pointer to the structure (after appropriate memory allocation):

```
typedef BUTTONDATA far * PBUTTONDATA;
```

As shown, each individual object or button may be tracked by storing a rectangle (pair of points) defining the boundary of the object. The toolbar, in turn, is constructed from a plurality of such buttons as follows (DESKBARINFO record).

```
// This is the main structure of the toolbar.
typedef struct
{
    HWND         hwndReside;   // current host
                                  of the toolbar
    PBUTTONDATA  pBtnList;     // Array of button
                                  (using
                                  // struct shown
                                  above)
    i16          nCount;       // Number of button
                                  in tool bar
    i16          idButtonHelp; // String id of "hints"
                                  to show
                                  // in status.
} DESKBARINFO;
```

An array of DESKBARINFO records may be referenced through a pointer to the structure (after appropriate memory allocation):

```
typedef DESKBARINFO far * PDESKBARINFO;
```

In this manner, a plurality of toolbars, each having a plurality of button objects, may be constructed and maintained.

Improved User Feedback: "Hints"

Figure 4A:
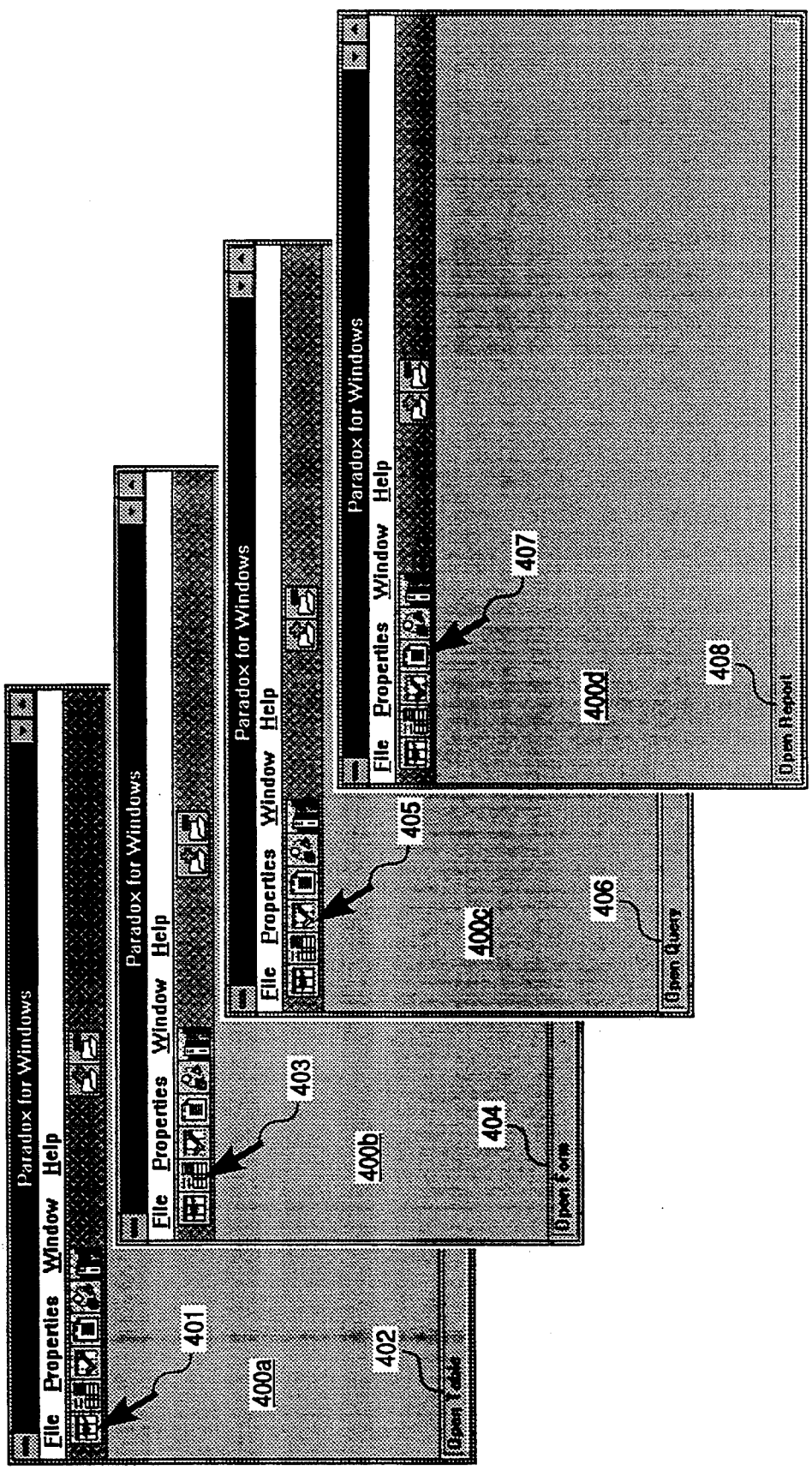
FIGS. 4A-B are a series of bitmap screenshots which illustrate (in animation fashion) a "hint" interface method of the present invention.
Figure 4B:
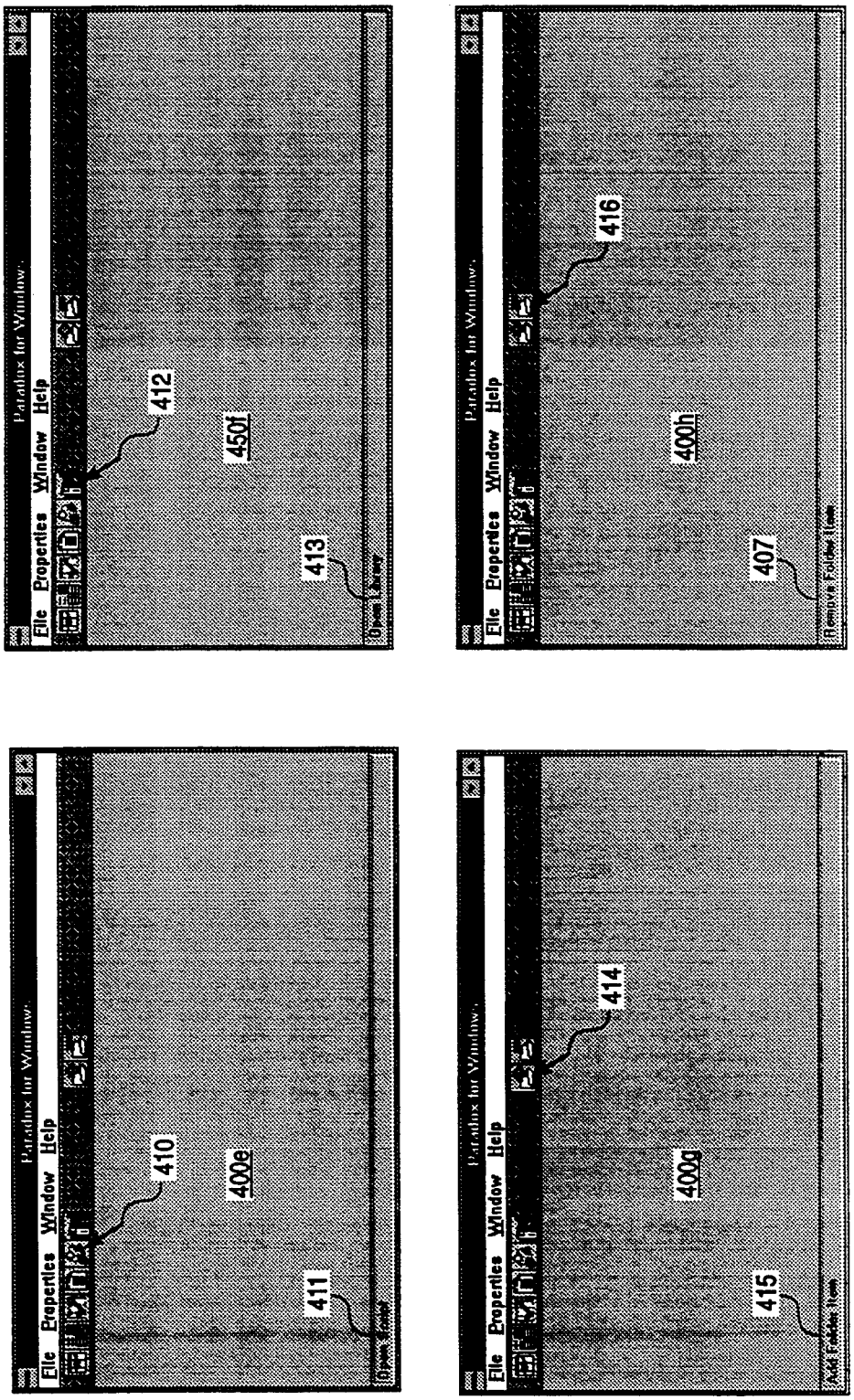
Figure 4C:
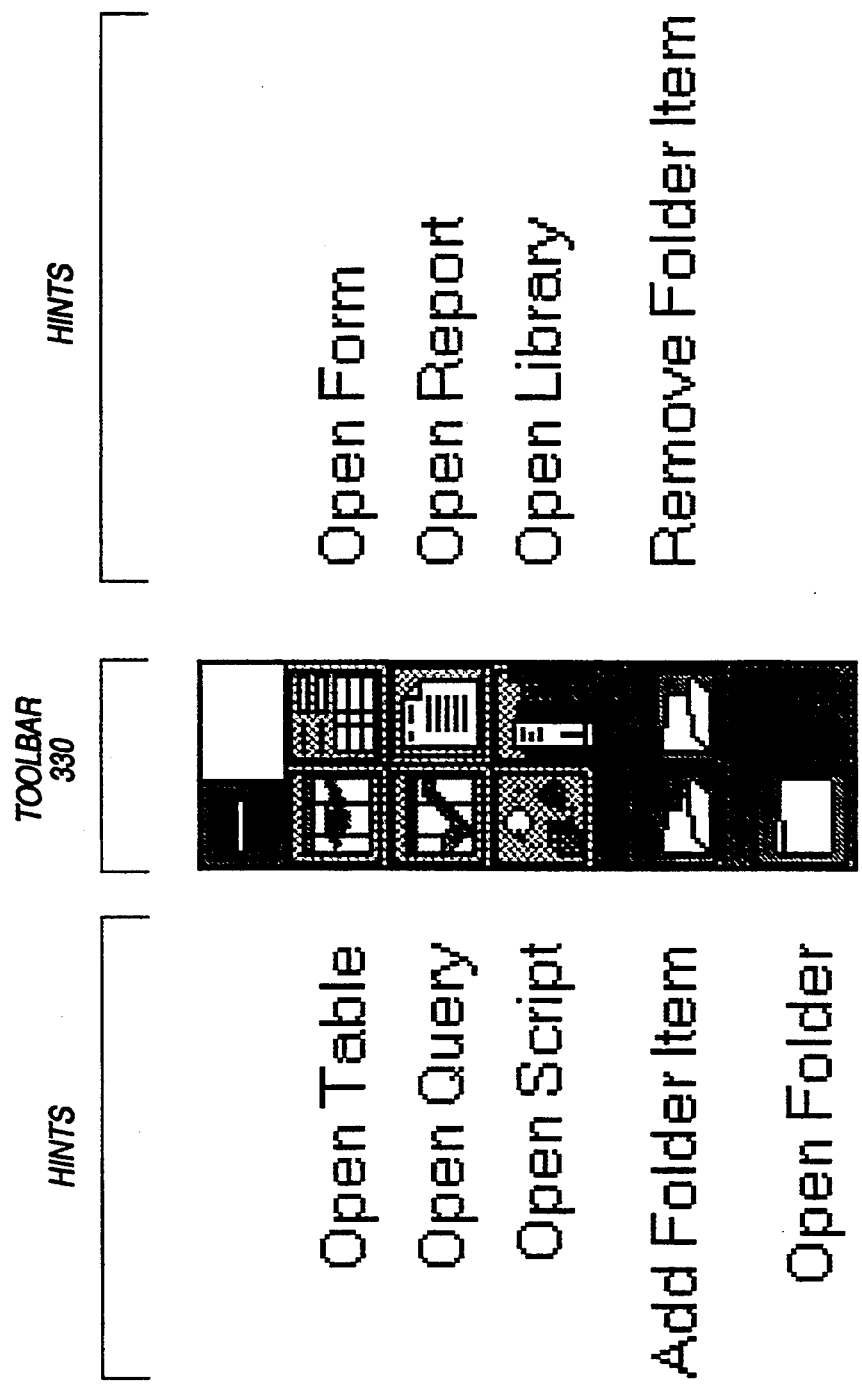
FIG. 4C is a bitmap which summarizes the hints for the toolbar interface component from the improved graphical user interface of the present invention.

Referring now to FIGS. 4A–C, the method of providing user interface "hints" in accordance with the present invention will now be introduced. As will be recalled from FIG. 3A, the toolbar 330 includes a plurality of bitmaps, each one indicating a particular action to be performed by the system upon user selection. As will be readily appreciated by inspecting the icons, the functionality associated with each is by no means self-evident. While the user may be able to discern certain functionality, such as a "cut" operation from a bitmap displaying a pair of scissors, by far the majority of icons will employ bitmap images which cannot be discerned upon first inspection. In prior art systems, therefore, a user would be forced to first "look up" the meaning of an icon before he or she uses it. Moreover, the user would have to then memorize the defined meaning (or resort to continually looking up its meaning). As a result, toolbars of prior art systems are typically under-utilized by most end users.

The method of the present invention for providing hints is perhaps best illustrated by an example. FIG. 4A illustrates an application workspace 400 for a popular desktop database program, Paradox® for Windows, available from Borland International of Scotts Valley, Calif. The series of images (400a-d) animates the operation of the user moving a screen cursor from an initial position 401 to a final position 407. As the cursor sweeps from left to right, its tip ("hot spot") traverses several toolbar buttons. According to the present invention, as the cursor touches (i.e., enters the window of) a button, a descriptive message or "hint"—typically a string of text and/or graphic—is displayed in the status line window. As soon as the cursor moves away from a particular button, its corresponding hint is removed (erased) from the status window. Thus, in the example at hand, upon entry of the cursor into the first toolbar button (cursor position 401), a descriptive hint 402 is displayed for the button. As shown by the text 402, the user may now readily discern that the first button invokes the system command of "Open Table" (for opening a database table). In a similar manner, at cursor position 403, hint 404 is displayed in the status window for indicating that the second button invokes the system "Open Form" command. At cursor position 405, the hint "Open Query" 406 is displayed for the third button, and at cursor position 407, the hint "Open Report" 408 is displayed indicating the function of the fourth button.

Continuing on to FIG. 4B, the cursor continues its sweeping motion across the various toolbar buttons. As shown at 400e, the cursor position 410 elicits the "Open Script" hint 411, indicating the function of the fifth button, and at cursor position 412, the hint 413 is displayed to indicate that the sixth button invokes an "Open Library" command. Completing the example, upon entry of the cursor into the seventh button, at cursor position 414, "Add Folder Item" hint 415 is displayed, and upon entry of the cursor into the last icon, at cursor position 416, hint "Remove Folder Item" 407 is displayed. The toolbar 330 and its corresponding hints are summarized in FIG. 4C.

Figure 5A:
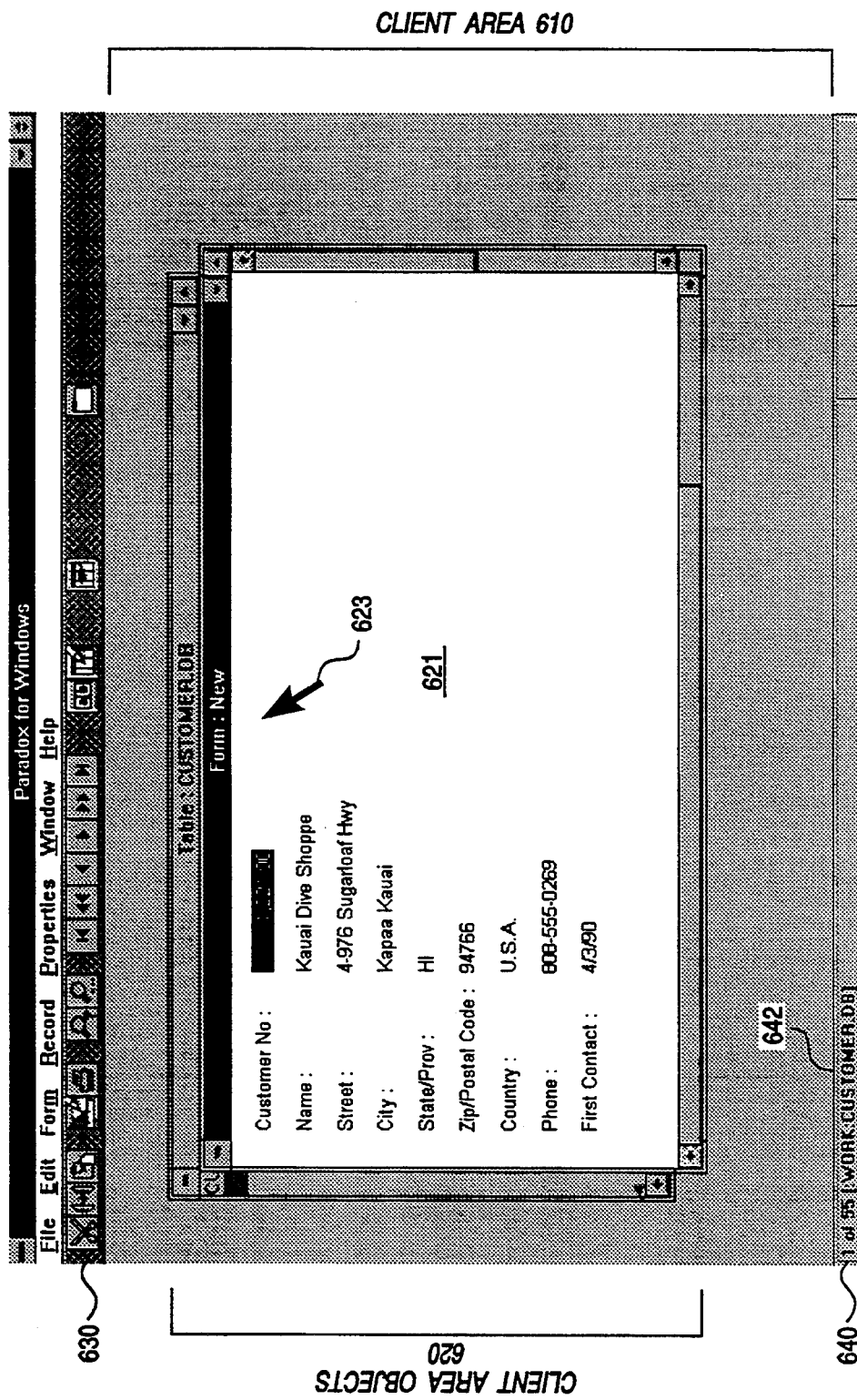
FIG. 5A is a bitmap screenshot which illustrates an exemplary operation of the graphical interface of the present invention, the example including client area objects which interact with a screen cursor.

As shown in FIG. 5A, popular applications, such as Paradox for Windows, typically have a multitude of toolbars, each one being employed in a specific context of the system. The figure shows two screen objects 620 displayed within client area 610. As Paradox is a database application, typical client area objects include a database table (e.g., customer.db) and form for that table (shown by the window 621). As can be seen by toolbar 630, the individual buttons comprising the toolbar have been updated for the current context at hand (creating a form for a database table).

The purpose of the example is twofold. First, from the location of the cursor at position 623, it can be seen that the user interface hints of the present invention may be adapted for other screen objects (in this instance, a database form). Thus, at status window 640, descriptive text 642 is displayed indicating the current relevance of the object which the cursor is touching.

Figure 5B:
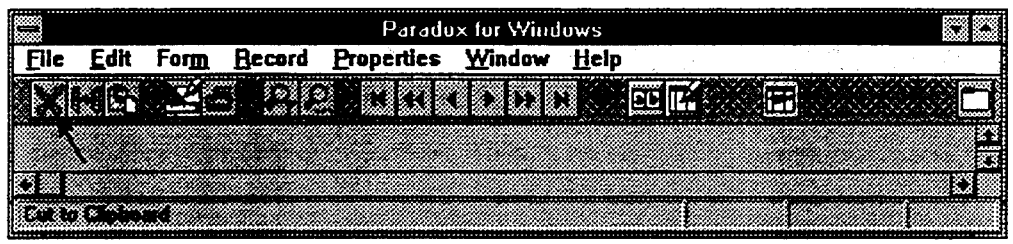
FIG. 5B is a sequence of bitmap screenshot frames illustrating hint methodology for the interface of FIG. 5A.
Figure 5B:
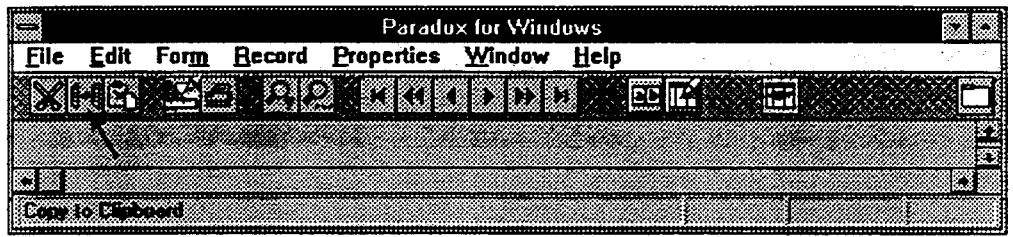
Figure 5B:
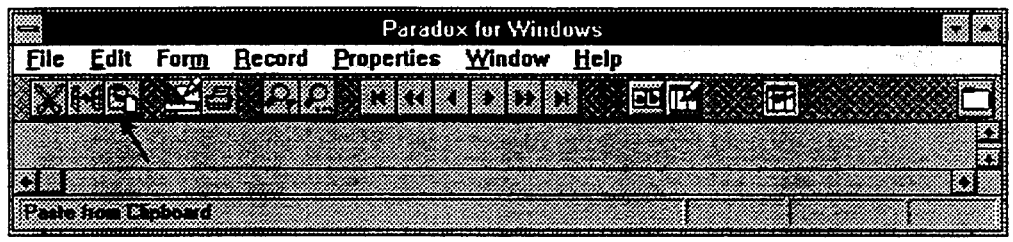
Figure 5B:
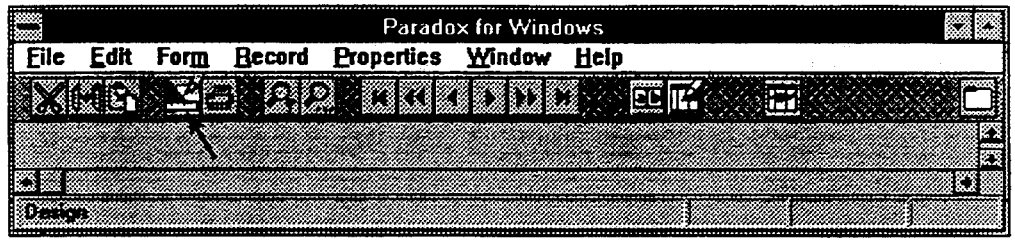
Figure 5B:
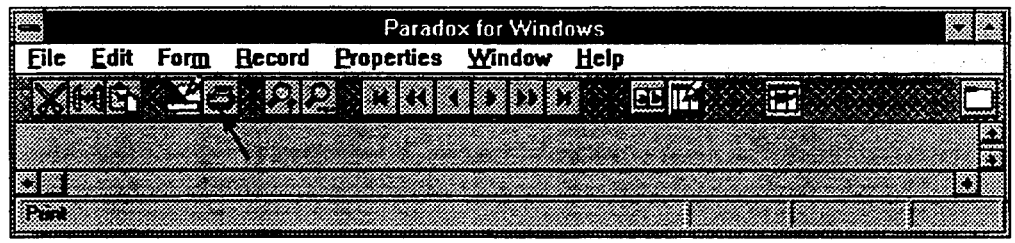
Figure 5B:
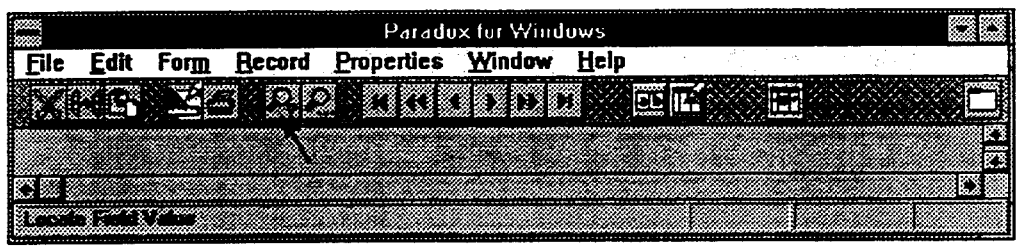
Figure 5B:
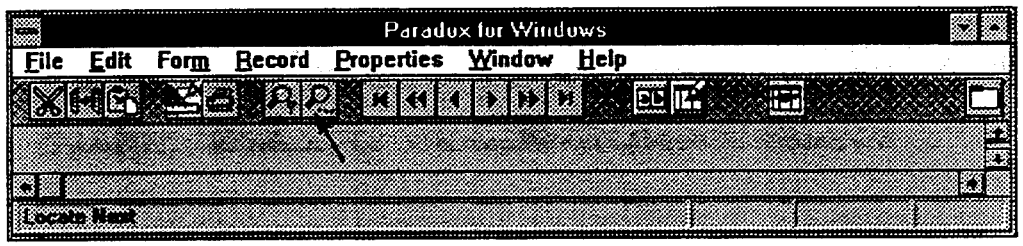
Figure 5B:
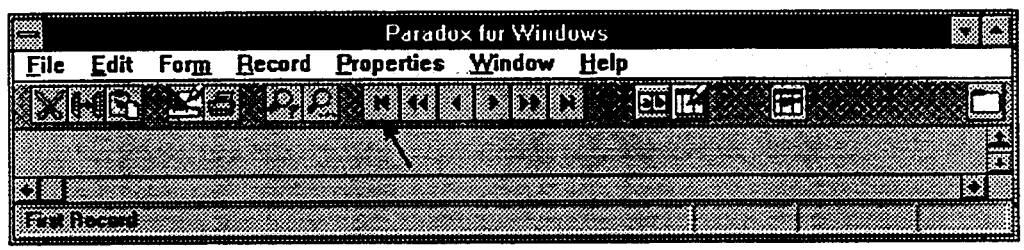
Figure 5B:
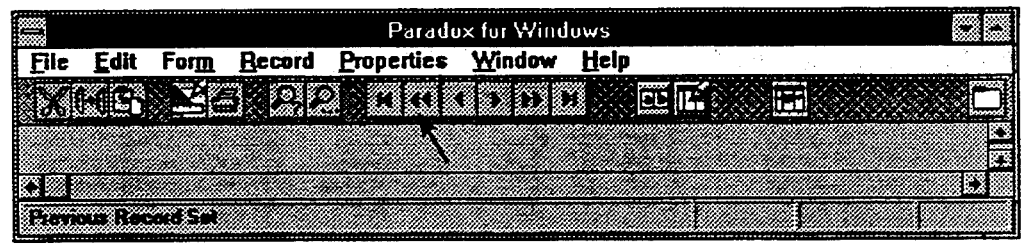
Figure 5B:
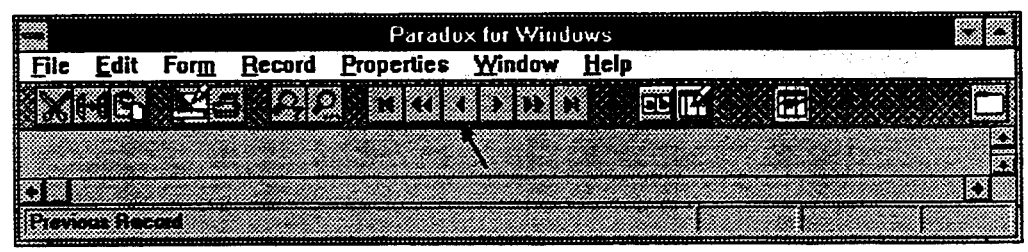
Figure 5B:
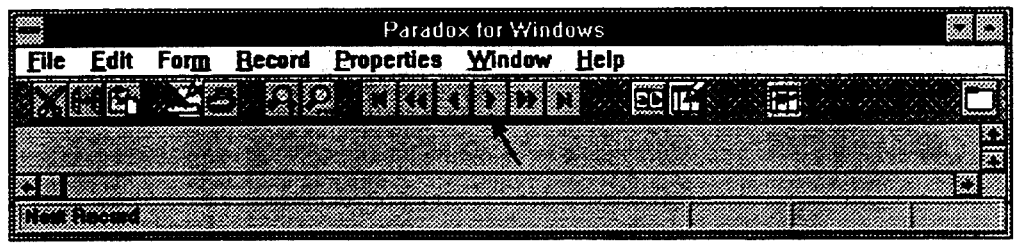
Figure 5B:
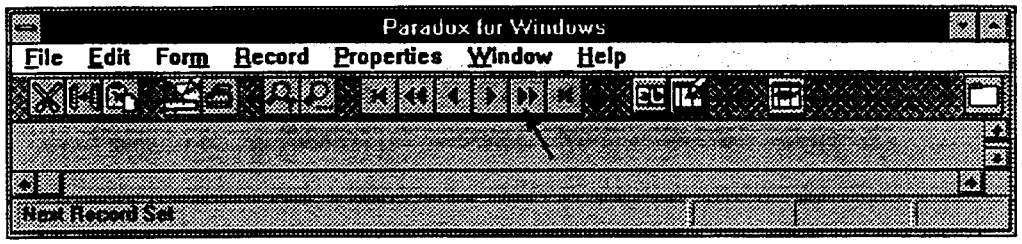
Figure 5B:
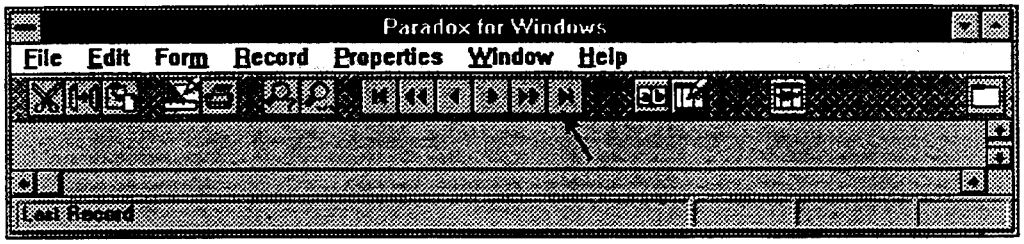
Figure 5B:
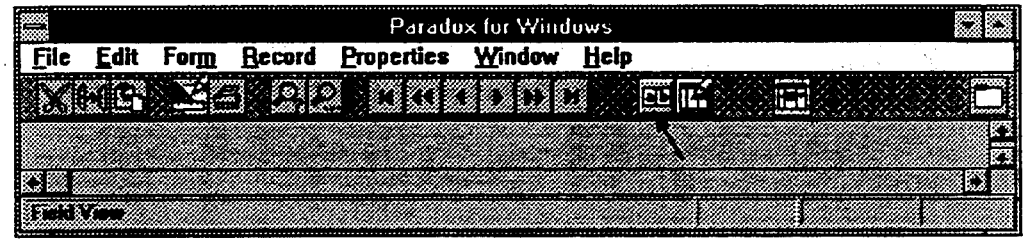
Figure 5B:
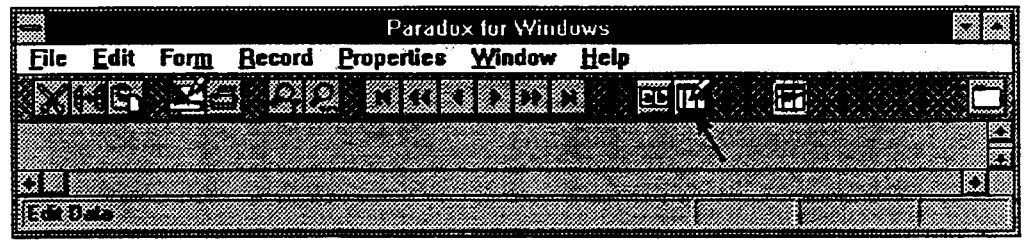
Figure 5B:
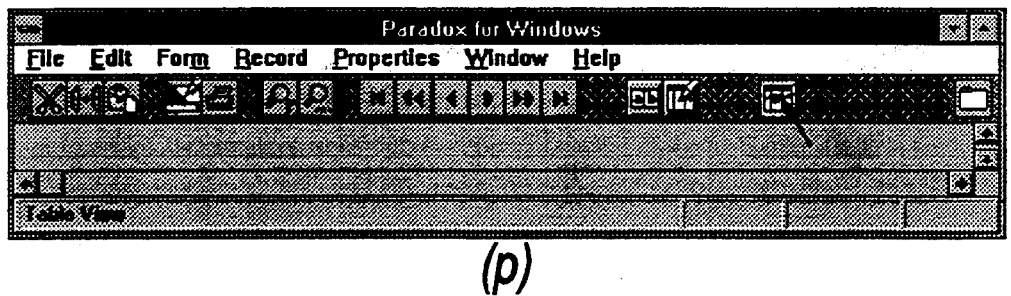
Figure 5C:
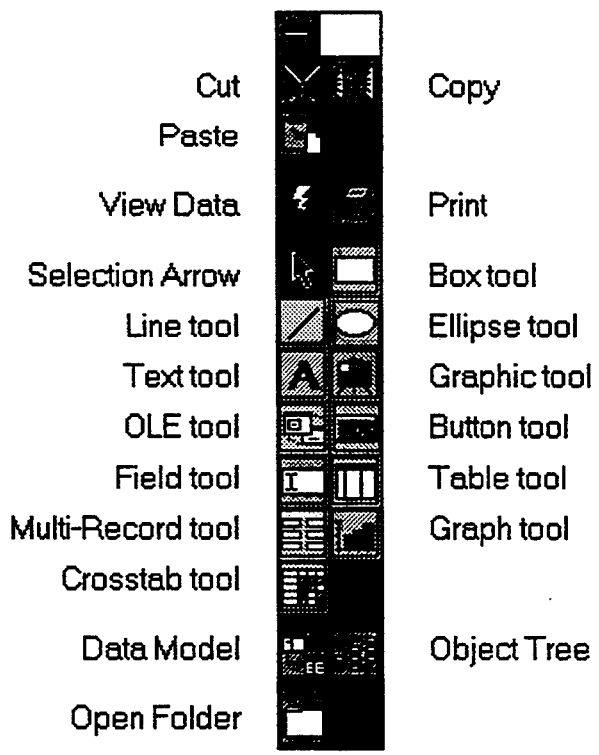
FIG. 5C is a bitmap summarizing the toolbar of FIG. 5A with exemplary hints.

Second, the example serves to illustrate that a user must typically deal with a multitude of toolbars, each having numerous bitmap images. Thus, for instance, toolbar 630 includes a plurality of different bitmap images, ones designed specifically for the task at hand. Again, in the small space afforded by a button object, the information conveyed is often insufficient to discern the meaning of the button object. According to the present invention, a different set of hints are provided for the toolbar 630. As shown in FIG. 5B, as the user sweeps the cursor from left to right, as animated by frames (a)-(p), the status window is updated with an appropriate hint. The Form Design toolbar 630 with its exemplary hints is summarized in FIG. 5C.

Figure 6A:
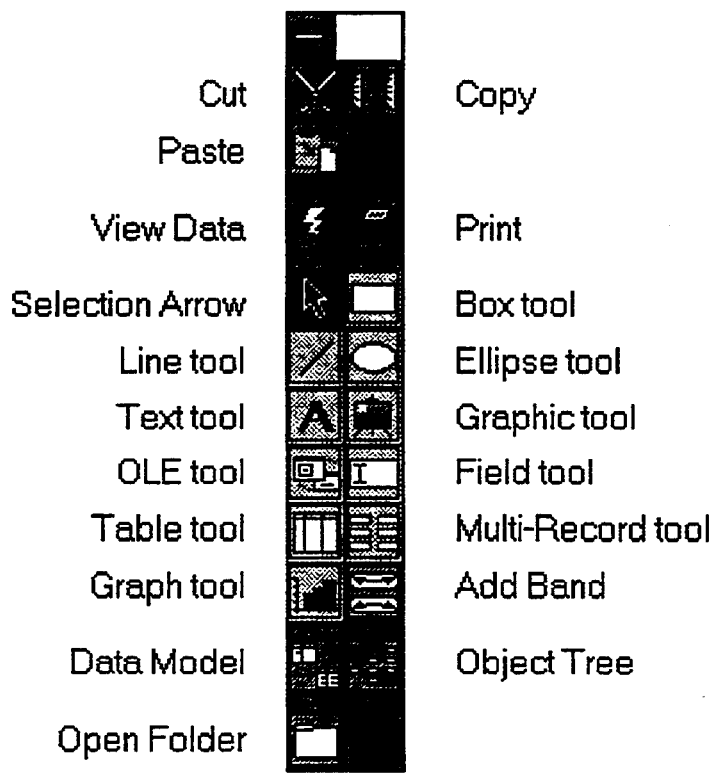
FIGS. 6A-F are a series of bitmaps illustrating a multitude of user interface toolbars, each one employed for a particular task; the bitmaps include exemplary hints which may be employed with each toolbar.
Figure 6B:
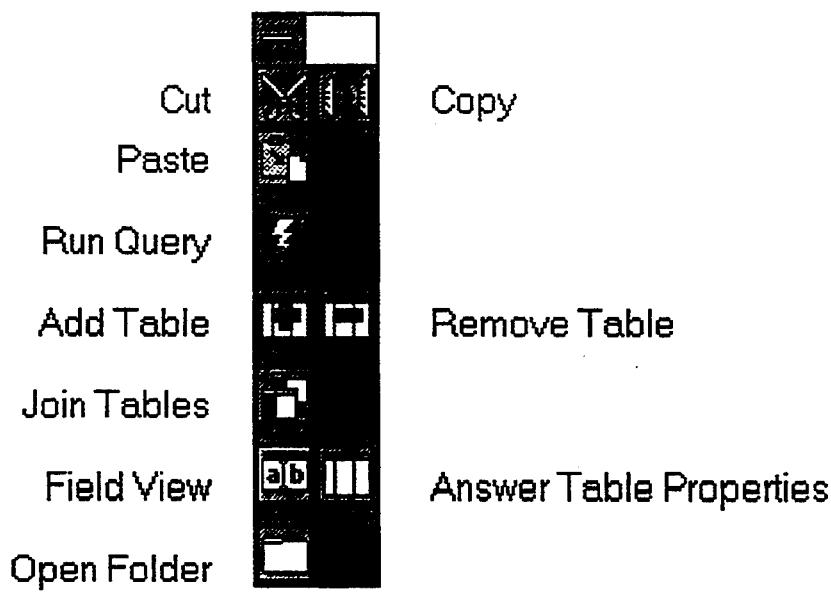
Figure 6C:
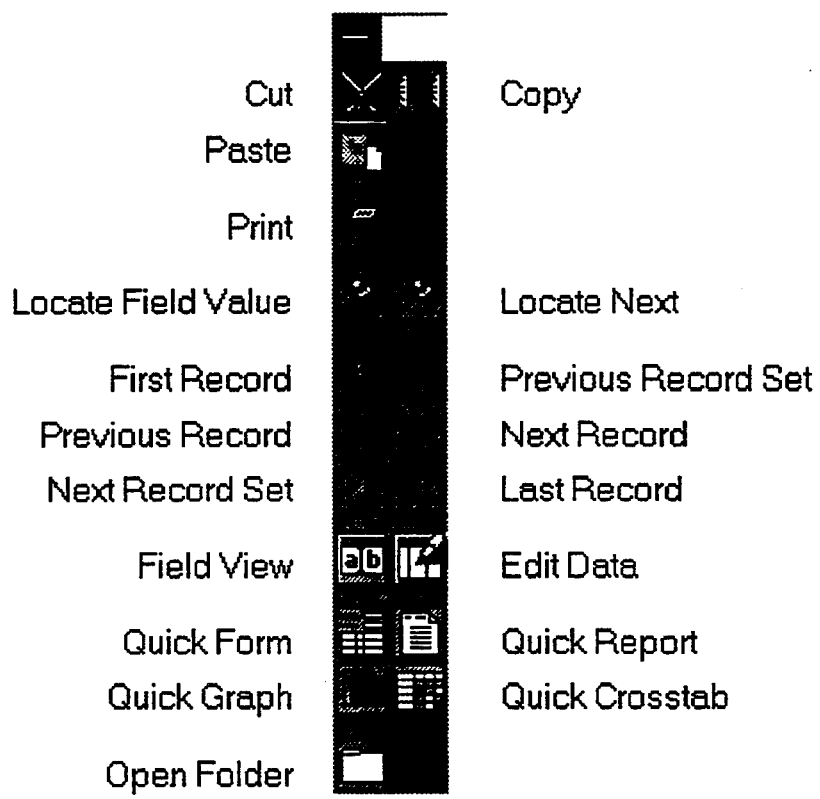
Figure 6D:
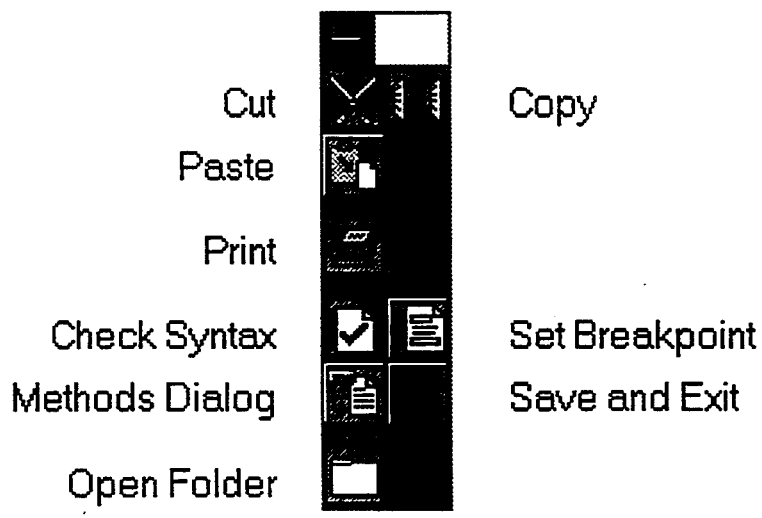
Figure 6E:
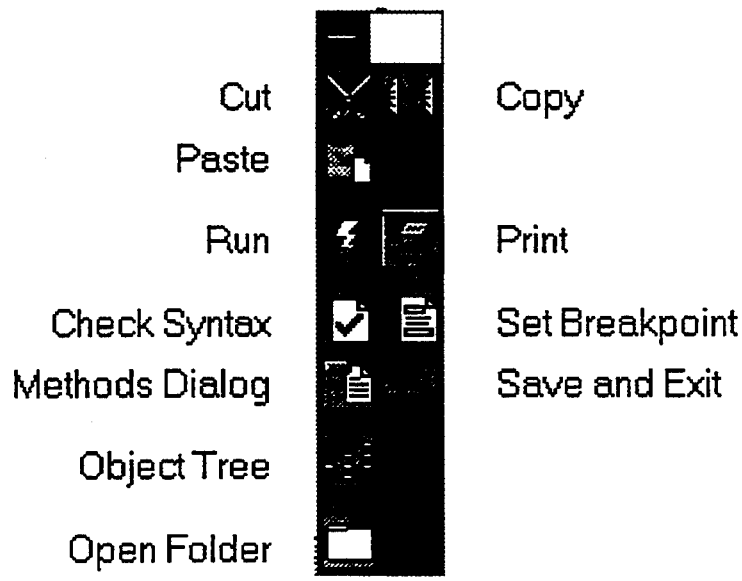
Figure 6F:
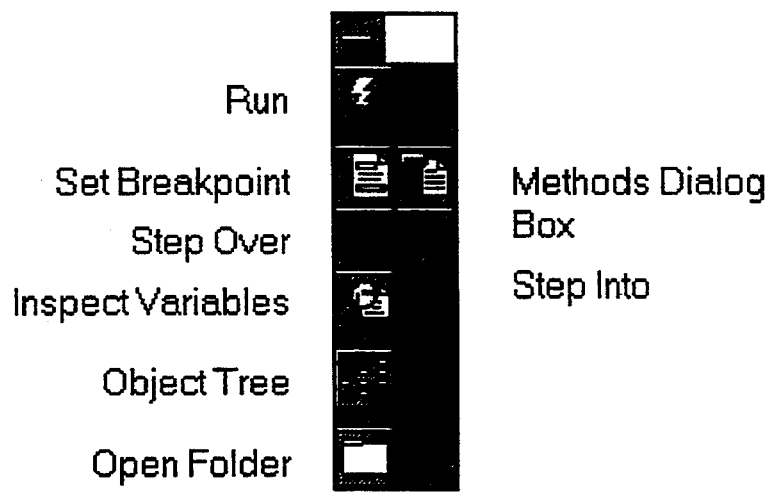

Addition exemplary hints for a plurality of different toolbars is shown in FIGS. 6A-F. As is readily apparent from the figures, a complex Windows application such as Paradox for Windows has far more iconic or bitmap images than could possibly be memorized by a typical user. Moreover, the function of any particular image may vary from one context to another. In a Report Design mode, for instance, a "lightning bolt" button may be defined to invoke a "View Data" operation (as shown in FIG. 6A). That very same image in a database query mode, on the other hand, may assume an entirely different meaning, such as "Run Query" (as shown in FIG. 6B). Thus, the present invention preserves the interface advantage of employing a toolbar and, at the same time, eliminates the profound disadvantage attendant with toolbars.

Internal Operation

Figure 7:
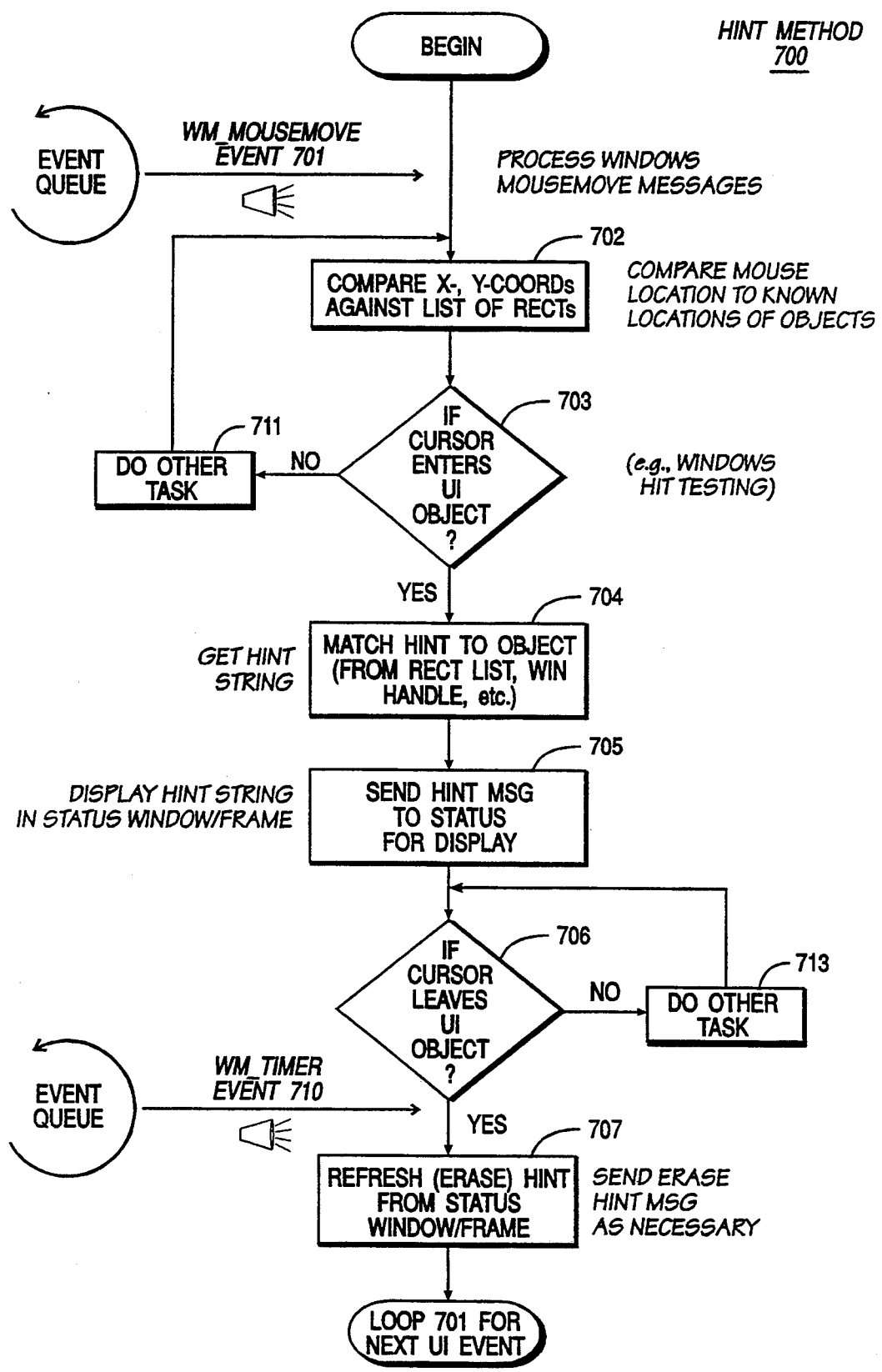
FIG. 7 is a flowchart illustrating a hint method of the present invention.

Referring now to FIG. 7, a hint method 700 of the present invention will be described by means of a flowchart. The method proceeds as follows. As shown by the move mouse event 701, the method is an event-driven process, with screen cursor or "mouse messages" being of particular interest. Upon receipt of a mouse move message at 701, the method compares the current cursor position (as reported with the mouse messages) against a list of known UI objects. In the instance where the UI object of interest is a toolbar, for example, the cursor position may be compared against a list of rectangles (Windows Rect structures). In this manner, entry of the cursor within an object of interest (i.e., the "hot spot" of the cursor touching the object) may be readily determined. At step 703, if the screen cursor enters an object of interest (yes), then at step 705 the hint (text string) for that object is determined (e.g., from the Rect list), and at step 705 the hint text is sent to the status window for display. If, on the other hand, the mouse has not entered an object (no at step 703), then the system may undertake other activity, as indicated by step 711.

Upon entry of the cursor into the object, the status line continues to display the hint until the cursor departs that object; this is indicated by steps 706 and 707. In particular, if the screen cursor departs the object at step 706 (yes), then at step 707, the previously-displayed hint text is erased from the status window. If, on the other hand, the cursor has not departed (no at step 706), then the system may undertake other activity, as indicated by step 713. Upon the cursor's departure and accompanying erasure of hint text, the method awaits the next user event (conceptually loops back to step 701 to await the cursor's entry into the next child window).

As shown by the figure, the method also responds to a timer event 710. In the preferred embodiment where mouse move messages are processed by the main window's window procedure, it is possible for the main window to "miss" a move mouse message. A user may, for instance, rapidly move the cursor out of the main window. In such a case, new move mouse messages are directed to the queue of the destination window, thus causing the main window to "miss" movement of the cursor out of a particular object being described with a hint. By periodically refreshing the hint, typically by setting a timer (for generating timer messages), this situation may be avoided. In particular, a window which has lost the current focus and "missed" the departure of the cursor will query itself for reconciling any differences between the current cursor location and the hint being displayed.

The following code snippet includes exemplary processing of the mouse event and timer event from the desktop window procedure.

```
U32 WNDPROC DeskWndProc( HWND hwnd,
U16 msg, U16 wParam, U32 lparam )
{
    PWINDATA        pData;
    PDESKBARINFO    pDeskBar;
    i16             count;
    PBUTTONDATA     pBtn;
    I32             ret;
    // Data for tool bar attached to instance of application
    window.
    pData = (PWINDATA) GetWindowWord( hwnd,
    WINDATAOFFSET );
    switch (msg)
    {
        .
        .
        .
    //
    // Process mouse event from the desktop window.
    //
        case WM_MOUSEMOVE:
            // Retrieve deskbar info
            pDeskbar = pData→DeskBar;
            // Keep current mouse coordinate.
            ptMouse = MAKEPOINT( lparam );
            pBtn = NULL;
            // Hit test process: Walk list of button in toolbar
            // until we found one hit by the mouse.
            for ( count = pDeskBar→nCount, pBtn =
            pDeskBar→pBtnList;
                count;
                count--, pBtn++)
            {
                if (PtInRect(&pBtn→rc, ptMouse))
                    break;
            }
            // If mouse over a button, show help in status
            // otherwise clear status line
            if (pBtn)
                DisplayHelpString(pDeskBar, pBtn→info.id);
            else
                ClearStatusLine();
            break;
    //
    // Retrieve timer message to clear status
    line message when mouse is
    // not over a button and possibly over a child window.
    //
        case WM_TIMER:
            // Retrieve deskbar info
            pDeskbar = pData→DesBar;
```

-continued

```
            // Get current mouse coordinate ourself.
            GetCursorPos(&ptMouse);
            pBtn = NULL;
            // Hit test process: Walk list of button in toolbar
            // until we found one hit by the mouse.
            for ( count = pDeskBar→nCount,
            pBtn = pDeskBar→pBtnList;
                count;
                count--, pBtn++)
            {
                if (PtInRect(&pBtn→rc, ptMouse))
                    break;
            }
            // If mouse not over a button, clear status line
            if (!pBtn)
                ClearStatusLine();
            break;
        .
        .
        .
}
```

Figure 8:
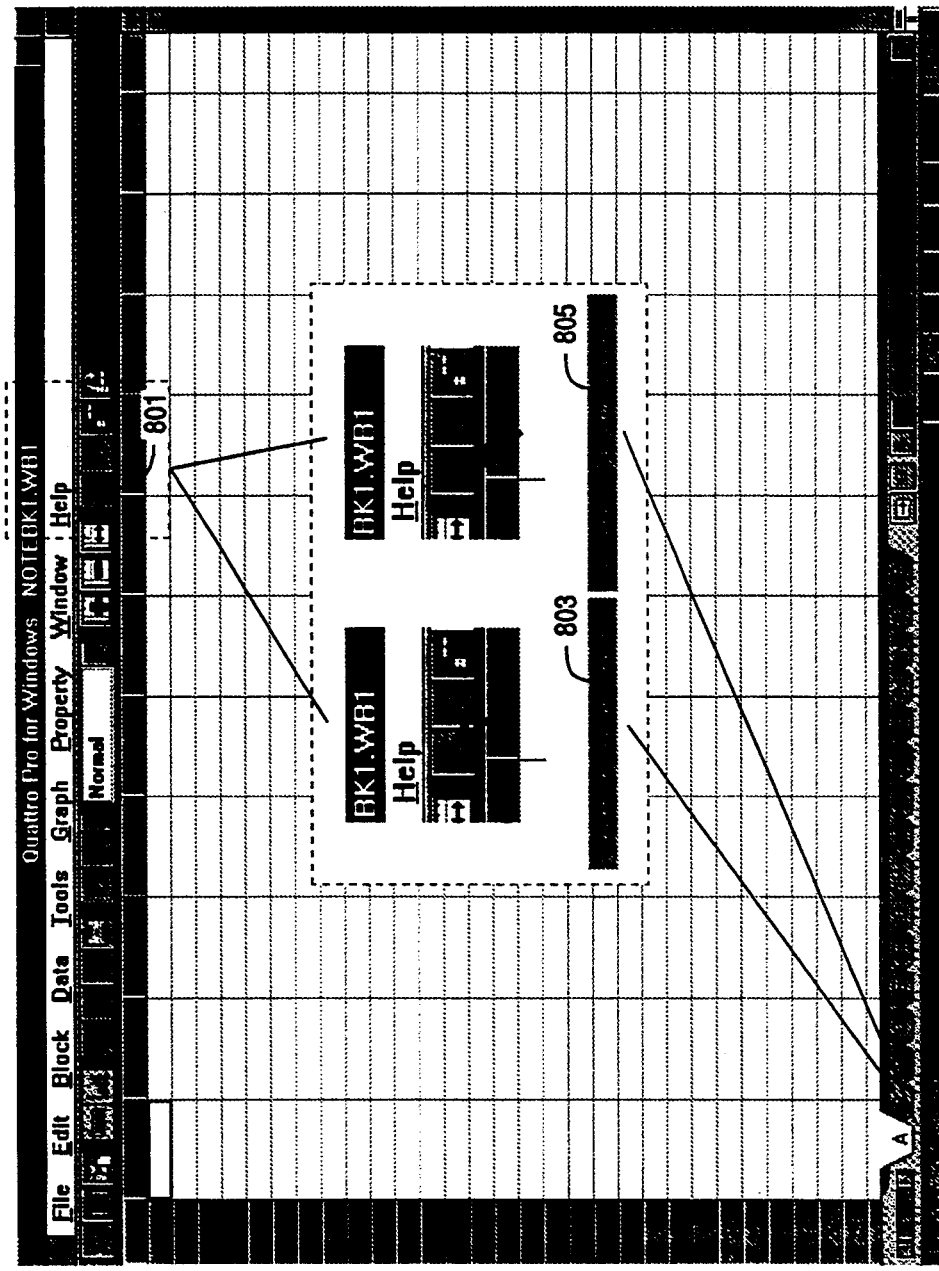
FIG. 8 is a bitmap screenshot illustrating multiple hints for a screen object having multiple regions.

Referring now to FIG. 8, adaptation of the hint method of the present invention for a screen object with multiple regions will now be described. FIG. 8 shows a screen object 801 having an upper and a lower half. Upon movement of the screen cursor to the upper half, the hint "Ascending SpeedSort button" 803 is shown. Upon movement of the cursor to the lower half of the object, the hint "Descending SpeedSort button" 805 is displayed. The foregoing hit-testing technique may be employed for determining subregions of an object, for example, by dividing the object into upper and lower reference rectangles. In this manner, the method of the present invention may easily be adapted to objects having multiple regions of interest.

Advantages Over Prior Art

The present invention recognizes that conventional techniques for providing screen feedback or help, such as "balloon help" and "intelligent cursors," operate in a fashion which is not only intrusive to the active workspace (client area), but is also computationally very inefficient. Balloon help, for instance, by "popping up" at a screen location proximate the cursor location, typically obscures the work product of interest. Moreover, the task of continually creating and destroying user interface windows (the "balloons"), being resource intensive, substantially degrades the performance of such systems. By overwriting the client area (i.e., active screen portion where the user's data is represented), for instance, these systems destroy the screen image of the underlying work product. To repair this image (upon cessation of the balloon help), such systems must "repaint" the image, typically by either regenerating the image from underlying data structures or restoring a prior-saved bitmap (portion overwritten). In either instance, performance of the system suffers as these are resource intensive operations.

The present invention eschews these "balloon help" or "intelligent prompting" methods. Instead, the hint prompts of the present invention are confined to a screen region removed from the user's main focus of attention. In this manner, the hint method of the present invention operates transparently, that is, it does not distract the user with help information which is not needed. Instead, if the user requires additional information for an object of interest, the user need only glance down at the screen region reserved for the hint. Balloon help systems, in contrast, are very distracting to use, as balloon windows are continually popping up in the screen region of main interest to the user. Moreover, since such systems are relatively resource (computational) intensive, the screen cursor often appears to "hang" while such systems are busy creating and destroying balloon objects. Thus, the present invention is advantageous not only in terms of user interface design, but also advantageous in its efficient use of system resources.

While the invention is described in some detail with specific reference to a single preferred embodiment and certain alternatives, there is no intent to limit the invention to that particular embodiment or those specific alternatives. Thus, the true scope of the present invention is not limited to any one of the foregoing exemplary embodiments but is instead defined by the following claims.

What is claimed is:

1. In a computer system having a screen device, a method for providing a user with information about pictorial graphical icons representing user-selectable commands displayed on the screen, the method comprising:
    (a) displaying a screen cursor on the screen device to indicate location;
    (b) moving the screen cursor to a screen location of interest;
    (c) if the screen cursor touches one of the pictorial graphical icons, displaying at a display location substantially along one side of the screen device a message describing said pictorial graphical icon;
    (d) moving the screen cursor to a second screen location of interest;
    (e) if the screen cursor touches a second one of the pictorial graphical icons, displaying a second message describing said second pictorial graphical icon at said display location; and
    (f) independently of steps (b)–(e), refreshing said information provided to the user about pictorial graphical icons by periodically testing whether the screen cursor still is positioned at a pictorial graphical icon whose derivative message is being displayed.

2. The method of claim 1, wherein said display location occupies the bottom-most portion of the screen.

3. The method of claim 1, wherein step (b) includes moving a pointing device which is operably coupled to the screen cursor.

4. The method of claim 1, wherein step (c) includes:
    storing a list of regions for pictorial graphical icons of interest;
    storing a descriptive message for each said pictorial graphical icon of interest;
    determining from the list of stored regions whether the cursor lies within one of the pictorial graphical icons of interest; and
    if the cursor is found to lie within one of the pictorial graphical icons, displaying the descriptive message for that pictorial graphical icon.

5. The method of claim 1, wherein said message includes text information describing the pictorial graphical icon.

6. The method of claim 1, wherein said message includes graphic information describing the pictorial graphical icon.

7. The method of claim 1, further comprising:
    (g) moving the screen cursor away from the pictorial graphical icon; and
    (h) erasing the message.

8. The method of claim 7, further comprising:
    repeating steps (b)–(d) for a plurality of screen locations, whereby a descriptive message is displayed for each pictorial graphical icon the screen cursor touches.

9. The method of claim 1, wherein the display location includes a small display window positioned away from the user's main focus of attention.

10. The method of claim 1, wherein said display location is positioned sufficiently far away from a pictorial graphical icon being touched by the cursor so that the user cannot perceive the message while looking at the pictorial graphical icon.

11. A graphical user interface system comprising:
    a computer having a screen device for displaying pictorial graphical icons representing system commands;
    means for indicating a location on the screen device with a cursor;
    means for determining if the cursor lies within one of the pictorial graphical icons;
    means for displaying a descriptive message when the cursor lies within one of the pictorial graphical icons, said message being located substantially along one edge of the screen device;
    means for changing said message when said cursor is moved from one pictorial graphical icon to another; and
    refresh means, operating independently of said determining means, for periodically testing whether the cursor still is positioned at a pictorial graphical icon whose descriptive message is being displayed.

12. The system of claim 11, wherein said means for determining includes:
    means for storing a location for desired ones of the pictorial graphical icon on the screen device, and determining if the cursor is positioned at one of the stored locations.

13. The system of claim 11, wherein said message includes selected combinations of text and graphic information.

14. The system of claim 11, wherein said one edge is a bottom-most edge of the screen device.

15. The system of claim 11, wherein said one edge is located substantially away from the user's main focus of attention, and wherein said message is perceived only when the user looks directly at the edge.

16. The system of claim 11, wherein the pictorial graphical icons displayed on the screen device include both text and graphic screen objects.

17. The system of claim 11, wherein the pictorial graphical icons are displayed on the screen device in a toolbar having a plurality of pictorial graphical icons, each of said pictorial graphical icons comprising a non-textual image for representing a system command to be performed upon selection of one of said pictorial graphical icons of said toolbar with the cursor.

18. The system of claim 11, wherein said means for displaying a descriptive message includes:
    means for assigning selected ones of said pictorial graphical icons an identifier for identifying a pictorial graphical icon together with textual information describing the pictorial graphical icon;
    means, responsive to said determining means, for matching an assigned identifier with a pictorial graphical icon which the cursor is positioned at; and means for identifying the textual information stored with the matched assigned identifier.

19. The system of claim 11, wherein said indicating means includes a pointing device for positioning the cursor at desired screen locations in response to signals generated by the pointing device upon movement by a user, and wherein said determining means operates in response to generation of said signals.

20. In a computer system including a display screen having a multi-window graphical user interface with a screen cursor, said multi-window graphical user interface including at least one pictorial graphical screen icon for invoking a user command upon selection with the screen cursor, said multi-window graphical user interface having application programs operating in response to messages posted by the system to said application programs, said messages for notifying said application programs of occurrence of events in the system, a method for providing messages to a user describing a command of a pictorial graphical screen icon of interest, the method comprising:

(a) for each said at least one pictorial graphical screen icon, storing a message describing the pictorial graphical screen icon;

(b) displaying one of said application programs on the display screen, the displayed application program having a main window and a status window for displaying said messages;

(c) positioning the screen cursor at a desired one of said pictorial graphical screen icons;

(d) upon entry of the screen cursor within a boundary of the desired pictorial graphical screen icon, identifying which one of the stored messages describes the desired pictorial graphical screen icon, said entry being detected by the displayed application program in response posting of a cursor movement message by the system upon movement of said screen cursor;

(e) displaying the identified message within the status window;

(f) repeating steps (c)-(e) for a plurality of pictorial graphical screen icons, whereby the status window is continually updated with a message describing a pictorial graphical screen icon currently pointed to by said screen cursor; and (g) independently of steps (d) and (e), periodically refreshing said status window by:
  (i) setting a system timer for generating periodic timing signals; and
  (ii) upon occurrence of a timing signal, refreshing the status window by determining if said screen cursor is still positioned within any of said at least one pictorial graphical screen icon and erasing any message which is displayed within said status window if said screen cursor is not positioned within a pictorial graphical screen icon, so that a correct message is displayed within said status window irrespective of whether a cursor movement message has been posted by the system in response to movement of said screen cursor.

21. The method of claim 20, wherein each said at least one pictorial graphical screen icon comprises a bit-mapped image occupying a relatively small screen area of the display screen.

22. The method of claim 20, wherein each of the messages includes textual information describing a command in detail sufficient to assist a novice user.

23. The method of claim 20, further comprising:

(h) upon exit of the screen cursor from the desired pictorial graphical screen icon, removing the displayed message from the status window.

24. The method of claim 20, wherein said status window is positioned on the display screen at a location fixed relative to the user interface.

25. The method of claim 20, wherein said status window is positioned on the display screen at a location which is removed from a main focus of attention of the user.

26. The method of claim 20, wherein said status window includes first and second clipping regions, and wherein said first clipping region includes messages describing commands of pictorial graphical screen icons, and wherein said second clipping region includes messages describing a general status of the system.

27. The method of claim 20, wherein each of said at least one pictorial graphical screen icon is rectangular in shape, and wherein step (d) includes:

comparing a current position of the screen cursor to a list of known rectangles, each of said known rectangles representing a boundary of a pictorial graphical screen icon; and if the screen cursor is positioned within a boundary of a pictorial graphical screen icon, retrieving the stored message for the pictorial graphical screen icon.

28. The method of claim 20, wherein each of said at least one pictorial graphical screen icon is located on the display screen with an orientation which is constant relative to one another and constant relative to the status window.

29. The method of claim 20, wherein said multi-window graphical user interface includes a plurality of window-based programs, each said window-based program comprising a main window having a client area for displaying data objects created by the user, and wherein said status window is positioned within the main window of one of said window-based programs at a location removed from the client area for that window-based program.

30. The method of claim 20, wherein said user interface includes a main window for displaying screen objects generated with application software, and wherein said status window is positioned along an edge of the main window.

31. In a computer system having a display screen with a user interface, said user interface including a toolbar comprising at least one pictorial graphical screen button, a method for providing hints to the user about the function of a pictorial graphical screen button of interest, the method comprising:

(a) for each said at least one screen button, storing a hint message together with an identifier indicating a screen button associated with the stored hint message, said pictorial graphical screen button invoking a system function upon selection by a user wherein said system function is selected from a group consisting of cutting, pasting, editing, and printing functions;

(b) moving a screen cursor for selecting a desired position on the display screen;

(c) upon movement of said screen cursor, determining if said screen cursor touches one of said at least one pictorial graphical screen button;

(d) if said screen cursor touches one of said at least one pictorial graphical screen button, identifying the one pictorial graphical screen button touched;

(e) displaying for each pictorial graphical screen button identified its hint message at a position on the display screen fixed relative to the user interface; and (f) independently of steps (b)-(d), refreshing said hints provided to the user by periodically testing whether said screen cursor touches a pictorial graphical screen button whose hint message is being displayed.

32. The method of claim 31, further comprising:

(g) repeating steps (c)-(e) for a plurality of screen locations, whereby a plurality of pictorial graphical screen buttons are touched by the screen cursor and are described to the user by the system.

33. The method of claim 31, further comprising: if said screen cursor does not touch a pictorial graphical screen button in step (d), erasing any hint message which is displayed.

34. The method of claim 31, wherein said user interface includes a region for displaying objects created by the user, and wherein said hint messages are displayed on the display screen at a location other than said region.

35. The method of claim 31, wherein selected ones of said at least one pictorial graphical screen button are clustered together.

36. A system for assisting a user with operation of a computer, the system comprising:

a computer having a processor and a memory;

a screen device for displaying a multi-window graphical user interface in first, second, and third display regions, said first display region for displaying objects having data supplied by the user, said second display region for displaying non-textual, pictorial icons representing operations to be performed on said objects by the computer upon selection by the user, and said third display region for providing information assisting the user with understanding a non-textual, pictorial icon;

pointing means for positioning a screen cursor at a desired screen location on the screen device;

means, responsive to said pointing means, for determining each one of said non-textual, pictorial icons which is traversed by the screen cursor;

means for describing to the user at the third display region each non-textual, pictorial icon as it is traversed by the screen cursor; and update means, operating independently of said means for determining, for repetitively testing a current screen location of the screen cursor for determining whether the screen cursor is still traversing a non-textual, pictorial icon which is being described at the third display region.

37. The system of claim 36, wherein the describing means includes means for storing in the memory descriptive information for each of said non-textual, pictorial icons.

38. The system of claim 36, wherein the screen device includes a multi-window graphical user interface having a client area and a status line, and wherein said first display region includes said client area and wherein said second display region includes said status line.

39. The system of claim 38, wherein said status line is located along a peripheral portion of said multi-window graphical user interface.

40. The system of claim 36, wherein said pointing means includes a mouse device for generating signals upon movement of the device by the user, and wherein said determining means is responsive to occurrence of said signals.

* * * * *